US008620938B2

(12) United States Patent
Taboada et al.

(10) Patent No.: US 8,620,938 B2
(45) Date of Patent: *Dec. 31, 2013

(54) METHOD, SYSTEM, AND APPARATUS FOR ROUTING A QUERY TO ONE OR MORE PROVIDERS

(75) Inventors: Roberto C. Taboada, Duvall, WA (US); Eric D. Bailey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/678,412

(22) Filed: Feb. 23, 2007

(65) Prior Publication Data

US 2007/0136261 A1     Jun. 14, 2007

Related U.S. Application Data

(63) Continuation of application No. 10/184,374, filed on Jun. 28, 2002, now Pat. No. 7,209,915.

(51) Int. Cl.
  *G06F 17/30* (2006.01)
(52) U.S. Cl.
  USPC .......................................... 707/758; 707/736
(58) Field of Classification Search
  USPC .............................. 707/3, 4, 5, 706, 758, 736
  See application file for complete search history.

(56) References Cited

U.S. PATENT DOCUMENTS

| 4,674,065 | A | 6/1987 | Lange et al. |
| 4,791,587 | A | 12/1988 | Doi |
| 4,868,750 | A | 9/1989 | Kucera et al. |
| 5,005,127 | A | 4/1991 | Kugimiya et al. |

(Continued)

FOREIGN PATENT DOCUMENTS

| CA | 2 246 920 A1 | 3/2000 |
| CN | 100429655 C | 10/2008 |

(Continued)

OTHER PUBLICATIONS

Dong-Guk Shin and Lung-Yung Chu, Establishing Logical Connectivity between Query Keywords and Database Contents, *Advances in Artificial Intelligence*, 12th Biennial Conference of the Canadian Society for Computational Studies of Intelligence, AI'98, Vancouver, BC, Canada, Jun. 18-20, 1998, Proceedings, p. 45-49.

(Continued)

*Primary Examiner* — Cam Truong
(74) *Attorney, Agent, or Firm* — Merchant & Gould

(57) ABSTRACT

A method and system for routing a query to one or more providers. The system may include a search interface for presenting a service list including one or more services offered by the one or more providers, permitting selection of one or more of the one or more services, and a query entry for receiving input of the query. A search processor is capable of receiving and parsing the query. A service recognizer for a particular provider is capable of receiving and analyzing one or more terms of the query to determine if the particular provider is a match for the query. A query router can route the query to the particular provider if the particular provider is determined to be a match and block the query to the particular provider if the particular provider is determined not to be a match. A results interface presents results of the query.

12 Claims, 15 Drawing Sheets

(56) References Cited

U.S. PATENT DOCUMENTS

| | | | |
|---|---|---|---|
| 5,020,019 A | 5/1991 | Ogawa | |
| 5,128,865 A | 7/1992 | Sadler | |
| 5,159,552 A | 10/1992 | van Gasteren et al. | |
| 5,251,130 A | 10/1993 | Andrews et al. | |
| 5,267,155 A | 11/1993 | Buchanan et al. | |
| 5,287,448 A | 2/1994 | Nicol et al. | |
| 5,297,039 A | 3/1994 | Kanaegami et al. | |
| 5,303,151 A | 4/1994 | Neumann | |
| 5,317,546 A | 5/1994 | Balch et al. | |
| 5,337,233 A | 8/1994 | Hofert et al. | |
| 5,341,293 A | 8/1994 | Vertelney et al. | |
| 5,351,190 A | 9/1994 | Kondo | |
| 5,386,564 A | 1/1995 | Shearer et al. | |
| 5,392,386 A | 2/1995 | Chalas | |
| 5,418,902 A | 5/1995 | West et al. | |
| 5,446,891 A | 8/1995 | Kaplan et al. | |
| 5,522,089 A | 5/1996 | Kikinis et al. | |
| 5,535,323 A | 7/1996 | Miller et al. | |
| 5,541,836 A | 7/1996 | Church et al. | |
| 5,546,521 A | 8/1996 | Martinez | |
| 5,581,684 A | 12/1996 | Dudzik et al. | |
| 5,596,700 A | 1/1997 | Darnell et al. | |
| 5,617,565 A | 4/1997 | Augenbraun et al. | |
| 5,625,783 A | 4/1997 | Ezekiel et al. | |
| 5,627,567 A | 5/1997 | Davidson | |
| 5,627,958 A | 5/1997 | Potts et al. | |
| 5,629,846 A | 5/1997 | Crapo | |
| 5,634,019 A | 5/1997 | Koppolu et al. | |
| 5,640,560 A | 6/1997 | Smith | |
| 5,657,259 A | 8/1997 | Davis et al. | |
| 5,685,000 A | 11/1997 | Cox | |
| 5,708,825 A | 1/1998 | Sotomayor | |
| 5,715,415 A | 2/1998 | Dazey et al. | |
| 5,717,923 A | 2/1998 | Dedrick | |
| 5,752,022 A | 5/1998 | Chiu et al. | |
| 5,761,689 A | 6/1998 | Rayson et al. | |
| 5,764,794 A | 6/1998 | Perlin | |
| 5,765,156 A | 6/1998 | Guzak et al. | |
| 5,781,189 A | 7/1998 | Holleran et al. | |
| 5,781,904 A | 7/1998 | Oren et al. | |
| 5,794,257 A | 8/1998 | Liu et al. | |
| 5,799,068 A | 8/1998 | Kikinis et al. | |
| 5,802,253 A | 9/1998 | Gross et al. | |
| 5,802,262 A | 9/1998 | Van De Vanter | |
| 5,802,299 A | 9/1998 | Logan et al. | |
| 5,802,530 A | 9/1998 | van Hoff | |
| 5,805,911 A | 9/1998 | Miller | |
| 5,809,318 A | 9/1998 | Rivette et al. | |
| 5,815,830 A | 9/1998 | Anthony | |
| 5,818,447 A | 10/1998 | Wolf et al. | |
| 5,819,273 A * | 10/1998 | Vora et al. | 707/10 |
| 5,821,931 A | 10/1998 | Berquist et al. | |
| 5,822,539 A | 10/1998 | van Hoff | |
| 5,822,720 A | 10/1998 | Bookman et al. | |
| 5,826,025 A | 10/1998 | Gramlich | |
| 5,832,100 A | 11/1998 | Lawton et al. | |
| 5,845,077 A | 12/1998 | Fawcett | |
| 5,845,278 A | 12/1998 | Kirsch et al. | |
| 5,848,386 A | 12/1998 | Motoyama | |
| 5,855,007 A | 12/1998 | Jovicic et al. | |
| 5,859,636 A | 1/1999 | Pandit | |
| 5,872,973 A | 2/1999 | Mitchell et al. | |
| 5,875,443 A | 2/1999 | Nielsen | |
| 5,877,757 A | 3/1999 | Baldwin et al. | |
| 5,884,266 A | 3/1999 | Dvorak | |
| 5,892,919 A | 4/1999 | Nielsen | |
| 5,893,073 A | 4/1999 | Kasso et al. | |
| 5,893,132 A | 4/1999 | Huffman et al. | |
| 5,895,461 A | 4/1999 | De La Huerga et al. | |
| 5,896,321 A | 4/1999 | Miller et al. | |
| 5,900,004 A | 5/1999 | Gipson | |
| 5,907,852 A | 5/1999 | Yamada | |
| 5,911,138 A * | 6/1999 | Li et al. | 1/1 |
| 5,913,214 A * | 6/1999 | Madnick et al. | 707/10 |
| 5,920,859 A | 7/1999 | Li | |
| 5,924,099 A | 7/1999 | Guzak et al. | |
| 5,933,139 A | 8/1999 | Feigner et al. | |
| 5,933,140 A | 8/1999 | Strahonr et al. | |
| 5,933,498 A | 8/1999 | Schneck et al. | |
| 5,940,614 A | 8/1999 | Allen et al. | |
| 5,944,787 A | 8/1999 | Zoken | |
| 5,946,647 A | 8/1999 | Miller et al. | |
| 5,948,061 A | 9/1999 | Merriman et al. | |
| 5,956,681 A | 9/1999 | Yamakita | |
| 5,974,409 A | 10/1999 | Sanu et al. | |
| 5,974,413 A | 10/1999 | Beauregard et al. | |
| 5,978,754 A | 11/1999 | Kumano | |
| 5,983,216 A | 11/1999 | Kirsch et al. | |
| 5,983,218 A | 11/1999 | Syeda-Mahmood | |
| 5,987,402 A | 11/1999 | Murata et al. | |
| 5,987,480 A | 11/1999 | Donohue et al. | |
| 5,991,719 A | 11/1999 | Yazaki et al. | |
| 5,995,756 A | 11/1999 | Herrmann | |
| 5,995,979 A * | 11/1999 | Cochran | 707/104.1 |
| 6,006,265 A | 12/1999 | Rangan et al. | |
| 6,006,279 A | 12/1999 | Hayes | |
| 6,012,055 A * | 1/2000 | Campbell et al. | 1/1 |
| 6,014,616 A | 1/2000 | Kim | |
| 6,018,761 A | 1/2000 | Uomini | |
| 6,026,388 A | 2/2000 | Liddy et al. | |
| 6,028,605 A | 2/2000 | Conrad et al. | |
| 6,029,135 A | 2/2000 | Krasle | |
| 6,029,171 A | 2/2000 | Smiga et al. | |
| 6,031,525 A | 2/2000 | Perlin | |
| 6,052,531 A | 4/2000 | Waldin et al. | |
| 6,061,516 A | 5/2000 | Yoshikawa et al. | |
| 6,061,701 A | 5/2000 | Hirai et al. | |
| 6,064,951 A | 5/2000 | Park et al. | |
| 6,067,087 A | 5/2000 | Krauss et al. | |
| 6,072,475 A | 6/2000 | Van Ketwich | |
| 6,073,090 A | 6/2000 | Fortune et al. | |
| 6,085,201 A | 7/2000 | Tso | |
| 6,088,711 A | 7/2000 | Fein et al. | |
| 6,092,074 A | 7/2000 | Rodkin et al. | |
| 6,102,969 A | 8/2000 | Christianson et al. | |
| 6,108,640 A | 8/2000 | Slotznick | |
| 6,108,674 A | 8/2000 | Murakami et al. | |
| 6,112,209 A | 8/2000 | Gusack | |
| 6,121,968 A | 9/2000 | Arcuri et al. | |
| 6,122,647 A | 9/2000 | Horowitz et al. | |
| 6,126,306 A | 10/2000 | Ando | |
| 6,137,911 A | 10/2000 | Zhilyaev | |
| 6,141,005 A | 10/2000 | Hetherington et al. | |
| 6,151,643 A | 11/2000 | Cheng et al. | |
| 6,154,738 A | 11/2000 | Call | |
| 6,167,469 A | 12/2000 | Safai et al. | |
| 6,167,523 A | 12/2000 | Strong | |
| 6,167,568 A | 12/2000 | Gandel et al. | |
| 6,173,316 B1 | 1/2001 | De Boor et al. | |
| 6,182,029 B1 | 1/2001 | Friedman | |
| 6,185,550 B1 | 2/2001 | Snow et al. | |
| 6,185,576 B1 | 2/2001 | McIntosh | |
| 6,199,046 B1 | 3/2001 | Heinzle et al. | |
| 6,199,081 B1 | 3/2001 | Meyerzon et al. | |
| 6,208,338 B1 | 3/2001 | Fischer et al. | |
| 6,216,141 B1 * | 4/2001 | Straub et al. | 715/234 |
| 6,219,698 B1 | 4/2001 | Iannucci et al. | |
| 6,246,404 B1 | 6/2001 | Feigner et al. | |
| 6,262,728 B1 | 7/2001 | Alexander | |
| 6,272,074 B1 | 8/2001 | Winner | |
| 6,272,505 B1 | 8/2001 | De La Huerga | |
| 6,282,489 B1 | 8/2001 | Bellesfield et al. | |
| 6,282,537 B1 | 8/2001 | Madnick et al. | |
| 6,291,785 B1 | 9/2001 | Koga et al. | |
| 6,292,768 B1 | 9/2001 | Chan | |
| 6,295,061 B1 | 9/2001 | Park et al. | |
| 6,297,822 B1 | 10/2001 | Feldman | |
| 6,300,950 B1 | 10/2001 | Clark et al. | |
| 6,308,171 B1 | 10/2001 | De La Huerga | |
| 6,311,152 B1 | 10/2001 | Bai et al. | |
| 6,311,177 B1 | 10/2001 | Dauerer et al. | |
| 6,311,194 B1 | 10/2001 | Sheth et al. | |
| 6,320,496 B1 | 11/2001 | Sokoler et al. | |
| 6,323,853 B1 | 11/2001 | Hedloy | |

(56) References Cited

U.S. PATENT DOCUMENTS

| | | | |
|---|---|---|---|
| 6,336,125 B2 | 1/2002 | Noda et al. | |
| 6,336,131 B1 | 1/2002 | Wolfe et al. | |
| 6,338,059 B1 | 1/2002 | Fields et al. | |
| 6,339,436 B1 | 1/2002 | Amro et al. | |
| 6,339,755 B1 | 1/2002 | Hetherington et al. | |
| 6,339,767 B1 * | 1/2002 | Rivette et al. | 707/781 |
| 6,347,398 B1 | 2/2002 | Parthasarathy et al. | |
| 6,349,295 B1 * | 2/2002 | Tedesco et al. | 707/3 |
| 6,353,926 B1 | 3/2002 | Parthesarathy et al. | |
| 6,360,222 B1 * | 3/2002 | Quinn | 1/1 |
| 6,381,742 B2 | 4/2002 | Forbes et al. | |
| 6,382,350 B1 | 5/2002 | Jezewski et al. | |
| 6,392,668 B1 | 5/2002 | Murray | |
| 6,396,515 B1 | 5/2002 | Hetherington et al. | |
| 6,401,067 B2 | 6/2002 | Lewis et al. | |
| 6,408,323 B1 | 6/2002 | Kobayashi et al. | |
| 6,413,100 B1 | 7/2002 | Dickmeyer et al. | |
| 6,415,304 B1 | 7/2002 | Horvitz | |
| 6,421,678 B2 | 7/2002 | Smiga et al. | |
| 6,424,979 B1 | 7/2002 | Livingston et al. | |
| 6,424,980 B1 * | 7/2002 | Iizuka et al. | 715/206 |
| 6,434,567 B1 | 8/2002 | De La Huerga | |
| 6,438,545 B1 | 8/2002 | Beauregard et al. | |
| 6,441,753 B1 | 8/2002 | Montgomery | |
| 6,442,545 B1 | 8/2002 | Feldman et al. | |
| 6,442,591 B1 | 8/2002 | Haynes et al. | |
| 6,456,304 B1 | 9/2002 | Anguilo et al. | |
| 6,470,091 B2 | 10/2002 | Koga et al. | |
| 6,473,069 B1 | 10/2002 | Gerpheide | |
| 6,477,510 B1 | 11/2002 | Johnson | |
| 6,480,860 B1 | 11/2002 | Monday | |
| 6,493,006 B1 | 12/2002 | Gourdol et al. | |
| 6,498,982 B2 | 12/2002 | Bellesfield | |
| 6,507,839 B1 | 1/2003 | Ponte | |
| 6,510,504 B2 | 1/2003 | Satyanarayanan | |
| 6,516,321 B1 | 2/2003 | De La Huerga | |
| 6,529,899 B1 | 3/2003 | Kraft et al. | |
| 6,556,972 B1 | 4/2003 | Bakis et al. | |
| 6,563,514 B1 | 5/2003 | Samar | |
| 6,571,253 B1 | 5/2003 | Thompson et al. | |
| 6,591,260 B1 | 7/2003 | Schwarzhoff | |
| 6,595,342 B1 | 7/2003 | Maritzen | |
| 6,601,075 B1 | 7/2003 | Huang et al. | |
| 6,604,099 B1 | 8/2003 | Chung | |
| 6,615,131 B1 | 9/2003 | Rennard et al. | |
| 6,629,092 B1 | 9/2003 | Berke | |
| 6,643,650 B1 | 11/2003 | Slaughter | |
| 6,654,734 B1 | 11/2003 | Mani | |
| 6,654,932 B1 | 11/2003 | Bahrs et al. | |
| 6,717,593 B1 | 4/2004 | Jennings | |
| 6,718,516 B1 | 4/2004 | Claussen et al. | |
| 6,724,403 B1 | 4/2004 | Santoro et al. | |
| 6,728,679 B1 | 4/2004 | Strubbe et al. | |
| 6,732,090 B2 | 5/2004 | Shanahan et al. | |
| 6,732,361 B1 | 5/2004 | Andreoli et al. | |
| 6,741,994 B1 | 5/2004 | Kang et al. | |
| 6,742,054 B1 | 5/2004 | Upton, IV | |
| 6,745,178 B1 * | 6/2004 | Emens et al. | 707/3 |
| 6,745,208 B2 | 6/2004 | Berg et al. | |
| 6,766,326 B1 | 7/2004 | Cena | |
| 6,785,670 B1 * | 8/2004 | Chiang et al. | 707/706 |
| 6,795,808 B1 | 9/2004 | Strubbe et al. | |
| 6,802,061 B1 | 10/2004 | Parthasarathy et al. | |
| 6,826,726 B2 | 11/2004 | Hsing et al. | |
| 6,829,631 B1 | 12/2004 | Forman et al. | |
| 6,845,499 B2 | 1/2005 | Srivastava et al. | |
| 6,857,103 B1 | 2/2005 | Wason | |
| 6,859,908 B1 | 2/2005 | Clapper | |
| 6,868,525 B1 | 3/2005 | Szabo | |
| 6,874,125 B1 | 3/2005 | Carroll et al. | |
| 6,874,143 B1 | 3/2005 | Murray et al. | |
| 6,880,129 B1 | 4/2005 | Lee et al. | |
| 6,883,137 B1 | 4/2005 | Girardot et al. | |
| 6,889,260 B1 | 5/2005 | Hughes | |
| 6,898,604 B1 | 5/2005 | Ballinger | |
| 6,901,402 B1 | 5/2005 | Corston-Oliver et al. | |
| 6,901,403 B1 | 5/2005 | Bata et al. | |
| 6,904,560 B1 | 6/2005 | Panda | |
| 6,925,457 B2 | 8/2005 | Britton et al. | |
| 6,925,470 B1 | 8/2005 | Sangudi et al. | |
| 6,944,857 B1 | 9/2005 | Glaser et al. | |
| 6,948,133 B2 | 9/2005 | Haley | |
| 6,950,831 B2 | 9/2005 | Haley | |
| 6,950,982 B1 | 9/2005 | Dourish | |
| 6,957,385 B2 | 10/2005 | Chan et al. | |
| 6,963,867 B2 | 11/2005 | Ford et al. | |
| 6,964,010 B1 | 11/2005 | Sharp | |
| 6,964,053 B2 | 11/2005 | Ho et al. | |
| 6,968,346 B2 | 11/2005 | Hekmatpour | |
| 6,975,983 B1 | 12/2005 | Fortescue et al. | |
| 6,976,090 B2 | 12/2005 | Ben-Shaul et al. | |
| 6,976,209 B1 | 12/2005 | Storisteanu et al. | |
| 6,981,212 B1 | 12/2005 | Claussen et al. | |
| 6,986,104 B2 | 1/2006 | Green et al. | |
| 6,990,654 B2 | 1/2006 | Carroll, Jr. | |
| 7,003,522 B1 | 2/2006 | Renar et al. | |
| 7,003,560 B1 | 2/2006 | Mullen et al. | |
| 7,013,289 B2 | 3/2006 | Horn et al. | |
| 7,013,303 B2 | 3/2006 | Faybishenko et al. | |
| 7,017,046 B2 | 3/2006 | Doyle et al. | |
| 7,017,175 B2 | 3/2006 | Alao et al. | |
| 7,024,658 B1 | 4/2006 | Cohen et al. | |
| 7,028,312 B1 | 4/2006 | Merrick et al. | |
| 7,032,174 B2 | 4/2006 | Montero et al. | |
| 7,039,859 B1 | 5/2006 | Sundaresan | |
| 7,051,076 B2 | 5/2006 | Tsuchiya | |
| 7,082,392 B1 | 7/2006 | Butler et al. | |
| 7,100,115 B1 | 8/2006 | Yennaco | |
| 7,111,077 B1 | 9/2006 | Starkovich et al. | |
| 7,113,976 B2 | 9/2006 | Watanabe | |
| 7,209,915 B1 * | 4/2007 | Taboada et al. | 707/3 |
| 7,216,351 B1 | 5/2007 | Maes | |
| 7,237,190 B2 | 6/2007 | Rollins et al. | |
| 7,281,245 B2 | 10/2007 | Reynar et al. | |
| 7,296,230 B2 | 11/2007 | Fukatsu et al. | |
| 7,302,634 B2 | 11/2007 | Lucovsky | |
| 7,325,194 B2 | 1/2008 | Moore et al. | |
| 7,356,537 B2 | 4/2008 | Reynar et al. | |
| 7,356,615 B2 | 4/2008 | Cai et al. | |
| 7,392,479 B2 | 6/2008 | Jones et al. | |
| 7,421,645 B2 | 9/2008 | Reynar | |
| 7,454,459 B1 | 11/2008 | Kapoor | |
| 2001/0016880 A1 | 8/2001 | Cai et al. | |
| 2001/0029605 A1 | 10/2001 | Forbes et al. | |
| 2001/0041328 A1 | 11/2001 | Fisher | |
| 2001/0042098 A1 | 11/2001 | Gupta et al. | |
| 2001/0049676 A1 | 12/2001 | Kepler et al. | |
| 2001/0049702 A1 | 12/2001 | Najmi | |
| 2001/0056461 A1 | 12/2001 | Kampe et al. | |
| 2002/0002590 A1 | 1/2002 | King et al. | |
| 2002/0003469 A1 | 1/2002 | Gupta | |
| 2002/0003898 A1 | 1/2002 | Wu | |
| 2002/0004803 A1 | 1/2002 | Serebrennikov | |
| 2002/0007309 A1 | 1/2002 | Reynar | |
| 2002/0023113 A1 | 2/2002 | Hsing et al. | |
| 2002/0023136 A1 | 2/2002 | Silver et al. | |
| 2002/0026450 A1 | 2/2002 | Kuramochi | |
| 2002/0029304 A1 | 3/2002 | Reynar et al. | |
| 2002/0032775 A1 | 3/2002 | Venkataramalah et al. | |
| 2002/0035581 A1 | 3/2002 | Reynar et al. | |
| 2002/0038180 A1 | 3/2002 | Bellesfield et al. | |
| 2002/0065110 A1 | 5/2002 | Enns et al. | |
| 2002/0065891 A1 | 5/2002 | Malik | |
| 2002/0066073 A1 | 5/2002 | Lienhard et al. | |
| 2002/0078222 A1 | 6/2002 | Compas et al. | |
| 2002/0087591 A1 | 7/2002 | Reynar et al. | |
| 2002/0091803 A1 | 7/2002 | Imamura et al. | |
| 2002/0099687 A1 | 7/2002 | Krishnaprasad | |
| 2002/0100036 A1 | 7/2002 | Moshir et al. | |
| 2002/0103794 A1 | 8/2002 | Chang | |
| 2002/0103829 A1 | 8/2002 | Manning et al. | |
| 2002/0104080 A1 | 8/2002 | Woodard et al. | |
| 2002/0107735 A1 | 8/2002 | Henkin et al. | |
| 2002/0110225 A1 | 8/2002 | Cullis | |

(56) References Cited

U.S. PATENT DOCUMENTS

| | | |
|---|---|---|
| 2002/0120685 A1 | 8/2002 | Srivastava et al. |
| 2002/0129107 A1 | 9/2002 | Loughran et al. |
| 2002/0133523 A1 | 9/2002 | Ambler et al. |
| 2002/0149601 A1 | 10/2002 | Rajarajan et al. |
| 2002/0156774 A1 | 10/2002 | Beauregard et al. |
| 2002/0156792 A1 | 10/2002 | Gombocz et al. |
| 2002/0156929 A1 | 10/2002 | Hekmatpour |
| 2002/0169802 A1 | 11/2002 | Brewer et al. |
| 2002/0175955 A1 | 11/2002 | Gourdol et al. |
| 2002/0178008 A1 | 11/2002 | Reynar |
| 2002/0178182 A1 | 11/2002 | Wang et al. |
| 2002/0184247 A1 | 12/2002 | Jokela et al. |
| 2002/0188637 A1 | 12/2002 | Bailey |
| 2002/0188941 A1 | 12/2002 | Cicciarelli et al. |
| 2002/0194166 A1* | 12/2002 | Fowler ............... 707/3 |
| 2002/0196281 A1 | 12/2002 | Audleman et al. |
| 2002/0198909 A1 | 12/2002 | Huynh et al. |
| 2003/0002391 A1 | 1/2003 | Biggs |
| 2003/0004937 A1 | 1/2003 | Salmenkaita et al. |
| 2003/0005411 A1 | 1/2003 | Gerken |
| 2003/0009489 A1 | 1/2003 | Griffin |
| 2003/0014745 A1 | 1/2003 | Mah et al. |
| 2003/0018621 A1* | 1/2003 | Steiner et al. ............ 707/3 |
| 2003/0025728 A1 | 2/2003 | Ebbo et al. |
| 2003/0030672 A1 | 2/2003 | Hughes et al. |
| 2003/0046316 A1 | 3/2003 | Gergic et al. |
| 2003/0050911 A1 | 3/2003 | Lucovsky |
| 2003/0050924 A1 | 3/2003 | Faybishenko et al. |
| 2003/0051236 A1 | 3/2003 | Pace et al. |
| 2003/0055818 A1 | 3/2003 | Faybishenko et al. |
| 2003/0056207 A1 | 3/2003 | Fischer et al. |
| 2003/0081791 A1 | 5/2003 | Erickson et al. |
| 2003/0083910 A1 | 5/2003 | Sayal et al. |
| 2003/0084138 A1 | 5/2003 | Tavis et al. |
| 2003/0088544 A1 | 5/2003 | Kan et al. |
| 2003/0097318 A1 | 5/2003 | Yu et al. |
| 2003/0101190 A1 | 5/2003 | Horvitz |
| 2003/0101204 A1 | 5/2003 | Watson |
| 2003/0101416 A1 | 5/2003 | McInnes et al. |
| 2003/0105806 A1 | 6/2003 | Gayle et al. |
| 2003/0106040 A1 | 6/2003 | Rubin et al. |
| 2003/0115039 A1 | 6/2003 | Wang |
| 2003/0121033 A1 | 6/2003 | Peev et al. |
| 2003/0126120 A1 | 7/2003 | Faybishenko et al. |
| 2003/0126136 A1 | 7/2003 | Omoigui |
| 2003/0140308 A1 | 7/2003 | Murthy et al. |
| 2003/0154144 A1 | 8/2003 | Pokorny et al. |
| 2003/0158841 A1 | 8/2003 | Britton et al. |
| 2003/0158851 A1 | 8/2003 | Britton et al. |
| 2003/0167445 A1 | 9/2003 | Su |
| 2003/0172343 A1 | 9/2003 | Leymaster et al. |
| 2003/0176995 A1 | 9/2003 | Sukehiro |
| 2003/0177341 A1 | 9/2003 | Devillers |
| 2003/0182258 A1 | 9/2003 | Sakamoto et al. |
| 2003/0182391 A1 | 9/2003 | Leber et al. |
| 2003/0192040 A1 | 10/2003 | Vaughan |
| 2003/0195871 A1 | 10/2003 | Luo et al. |
| 2003/0195937 A1 | 10/2003 | Kircher et al. |
| 2003/0212527 A1 | 11/2003 | Moore et al. |
| 2003/0220795 A1 | 11/2003 | Arayasantiparb et al. |
| 2003/0220913 A1 | 11/2003 | Doganata et al. |
| 2003/0229593 A1 | 12/2003 | Raley et al. |
| 2003/0233330 A1 | 12/2003 | Raley et al. |
| 2003/0237049 A1 | 12/2003 | Sawicki et al. |
| 2004/0002939 A1 | 1/2004 | Arora |
| 2004/0003389 A1 | 1/2004 | Reynar et al. |
| 2004/0006564 A1 | 1/2004 | Lucovsky et al. |
| 2004/0006741 A1 | 1/2004 | Radja et al. |
| 2004/0024875 A1 | 2/2004 | Horvitz |
| 2004/0039990 A1 | 2/2004 | Bakar et al. |
| 2004/0044959 A1 | 3/2004 | Shanmugasundaram |
| 2004/0068694 A1 | 4/2004 | Kaler |
| 2004/0075697 A1 | 4/2004 | Maudlin |
| 2004/0083218 A1 | 4/2004 | Feng |
| 2004/0133846 A1 | 7/2004 | Khoshatefeh et al. |
| 2004/0143581 A1 | 7/2004 | Bohannon |
| 2004/0162833 A1 | 8/2004 | Jones et al. |
| 2004/0165007 A1 | 8/2004 | Shafron |
| 2004/0172584 A1 | 9/2004 | Jones et al. |
| 2004/0199861 A1 | 10/2004 | Lucovsky |
| 2004/0201867 A1 | 10/2004 | Katano |
| 2004/0230666 A1 | 11/2004 | Taboada et al. |
| 2004/0236717 A1 | 11/2004 | Demartini et al. |
| 2004/0243575 A1 | 12/2004 | Ohashi |
| 2005/0050164 A1 | 3/2005 | Burd et al. |
| 2005/0055330 A1 | 3/2005 | Britton et al. |
| 2005/0091607 A1 | 4/2005 | Satou et al. |
| 2005/0094850 A1 | 5/2005 | Nakao |
| 2005/0108195 A1 | 5/2005 | Yalovsky et al. |
| 2005/0120313 A1 | 6/2005 | Rudd et al. |
| 2005/0155017 A1 | 7/2005 | Berstis et al. |
| 2005/0182617 A1 | 8/2005 | Reynar et al. |
| 2005/0187926 A1 | 8/2005 | Britton et al. |
| 2005/0193335 A1 | 9/2005 | Dorai et al. |
| 2005/0278309 A1 | 12/2005 | Evans et al. |
| 2006/0026170 A1 | 2/2006 | Kreitler et al. |
| 2006/0101005 A1 | 5/2006 | Yang et al. |
| 2006/0173674 A1 | 8/2006 | Nakajima et al. |
| 2007/0005702 A1 | 1/2007 | Tokuda et al. |
| 2007/0073652 A1 | 3/2007 | Taboada et al. |
| 2007/0136261 A1 | 6/2007 | Taboada et al. |
| 2008/0021886 A1 | 1/2008 | Wang-Aryattanwanich et al. |
| 2008/0046812 A1 | 2/2008 | Reynar et al. |

FOREIGN PATENT DOCUMENTS

| | | |
|---|---|---|
| CN | ZL 200410005390 | 10/2008 |
| EP | 0 364 180 A2 | 4/1990 |
| EP | 0 481 784 A2 | 4/1992 |
| EP | 0 598 511 A2 | 5/1994 |
| EP | 0 872 827 A2 | 10/1998 |
| EP | 0 810 520 B1 | 12/1998 |
| EP | 1 093 058 A1 | 4/2001 |
| EP | 1 280 068 A2 | 1/2003 |
| EP | 1 361 523 A2 | 11/2003 |
| EP | 1 376 392 A2 | 1/2004 |
| EP | 1 447 754 A1 | 8/2004 |
| JP | 64-088771 | 4/1989 |
| JP | 05-174013 | 7/1993 |
| JP | 08-272662 | 10/1996 |
| JP | 09-138636 | 5/1997 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2002-041353 | 2/2002 |
| JP | 2002-163250 | 6/2002 |
| JP | 2002-222181 | 8/2002 |
| WO | WO 95/07510 A1 | 3/1995 |
| WO | WO 99/17240 A1 | 4/1999 |
| WO | WO 00/54174 A1 | 9/2000 |
| WO | WO 00/67117 A2 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/86390 A2 | 11/2001 |
| WO | WO 02/15518 A2 | 2/2002 |
| WO | WO 02/42928 A1 | 5/2002 |
| WO | WO 02/099627 A1 | 12/2002 |
| WO | WO 2004/012099 A2 | 2/2004 |

OTHER PUBLICATIONS

Ho-Chuan Huang, Jon Kerridge, and Shang-Liang Chen, A Query Mediation Approach to Iteroperability of Heterogeneous Databases, *Australian Computer Science Communications*, vol. 22, No. 2, (1999), p. 41-48.

IEEE 100 The Authoritative Dictionary of IEEE Standards Terms, 2000, IEEE Press, 7th Edition, p. 795.

Jaap C. Hage, Maarten van der Meulen, and Georges Span, Intelligent Information Retrieval from Multiple Databases, *Informatica e Diritto*, vol. 2, No. 2, (1993), p. 149-164.

(56) References Cited

OTHER PUBLICATIONS

Microsoft Press Computer Dictionary, 1997, Microsoft Press, 3rd Edition, p. 355.
Susan Gauch, Jianying Wang, and Satya Mahesh Rachakonda—University of Kansas, A Corpus Analysis Approach for Automatic Query Expansion and Its extension to Multiple Databases, *ACM Transactions on Information Systems*. vol. 17, No. 3, (Jul. 1999), p. 250-269.
Yigal Arens, Chin Y. Chee, Chun-Nan Hsu and Craig A Knoblock, Retrieving and Integrating Data from Multiple Information Sources, *International Journal of Intelligent and Cooperative Information Systems*, vol. 2, No. 2 (1993), p. 127-158.
"Altova markup your mind!" http://web.archive.org/web/20021204211721/http://altova.com/products_ide.html, Dec. 2002, pp. 1-3.
"Being 'Smart' with Smart Tags in Office XP", Create for Mississippi, Aug. 2001, http://www.create.cett.msstate.edu/create/howto/smart_tags.pdf, 7 pp.
"Integrated Development Enviorment (IDE)", http://web.archive.org/web/20020602032242/http:altova.com/products_ide.html, Jun. 2002, pp. 1-2.
"Intelligent Text Processing: About", http://www.syntalex.co.uk/about/about.html, download date: Aug. 7, 1999, 1 pp.
"Intelligent Text Processing: Automatic Cross-Referencing", http://www.syntalex.co.uk/services/acrl.html, download date Aug. 7, 1999, 3 pp.
"Intelligent Text Processing: Case Study: Context", http://www.syntalex.co.uk/casestudies/context.html, download date: Aug. 7, 1999, 3 pp.
"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1003/CHMCABT.HTM, retrieved on Nov. 7, 2006, 2 pp.
"Smart Tags: Dumb Technology?", webreference.com, Online, Aug. 29, 2001, http://www.webreference.com/xml/column30/3.html, 3 pp.
"Using Flyswat", http://www.flywsat.com/using.html, download date: Sep. 28, 1999, 1 pp.
"What is Flyswat", http://www.flyswat.com, download date: Sep. 28, 1999, 5 pp.
"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pp.
"BizTalk Server 2002 Compiling Maps", http://msdn.microsoft.com/library/en-us/bts_2002/htm/lat_xmltools_map_concept_drgl.a . . . , Microsoft Corporation, 1999-2001, pp. 1.
"BizTalk Server 2002 Mapper User Interface", http://msdn.microsoft.com/library/en-us/bts_2002/htm/lat_xmltools_map_concept_codw . . . , Microsoft Corporation, 1999-2001, pp. 1.
"BizTalk Server 2002 Testing Maps", http://msdn.microsoft.com/library/en-us/bts_2002/htm/lat_xmltools_map_concept_fhhy.a . . . , Microsoft Corporation, 1999-2001, pp. 1-2.
"BizTalk Server 2002 View Links and Functoids by Using Grid Preview", http://msdn.microsoft.com/library/en-us/bts_2002/htm/lat_xmltools_map_check_fuwn.as . . . , Microsoft Corporation, 1999-2001, pp. 1.
"Chapter 8—Standard Input and Output", http://www.comp.lancs.ac.uk/computing/users/eiamjw/unix/chap8.html, 3 pp. (Publicly known at least as early as Sep. 26, 2005).
"Handout 38: Spell Checking, Word Counting, and Textual Analysis", http://courses.cs.emporia.edu/pheattch/courses/2002/cs501s02/hand38/, 3 pp. (Publicly known at least as early as Sep. 26, 2005).
"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.
"Integrating with External Systems: iPlanet™ Unified Development Server", Sun Microsystems, Inc., Ver. 5.0, Aug. 2001, pp. 127-156.
"Microsoft BizTalk Server 2002—Using BizTalk Mapper", http://msdn.Microsoft.com/library/en-us/bts_2002/htm/lat_xmltools_map_intro_zkqb.asp . . . , Microsoft Corporation, 1999-2001, pp. 1-2.
"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.
"Microsoft Unveils Visual Studio.NET Enterprise Tools", Microsoft Corporation, http://microsoft.com/presspass/press/2001/may01/05-21vseepr.mspx, May 2001, pp. 1-4.
"Module 123—Spell", http://duplex.hypermart.net/books/bsd/501-504.html, 4 pp (Publicly known at least as early as Sep. 26, 2005).
"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.
"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.
"Spellout Command", Commands Reference, vol. 5, http://www.rz.uni-hohenheim.de/betriebssysteme/unix/aix/ aix_4.3.3_doc/base_doc/usr/ share/man/inf . . . , 1 page (Publicly known at least as early as Sep. 26, 2005).
"The StarOffice™ 6.0 Suite: New Features Guide", Sun Microsystems, V. 1.1, Jul. 2002, pp. 1-31.
Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleld-437, 8 pgs.
Anonymous, "Moving and Copying Text Tutorial," Aug. 17, 2001, Internet Article, XP-002307566, http://tutorials.findtutorials.com/read/category/102/id/342/p/3, 4 pgs.
Apple Data Detectors User's Manual, Apple Computer, Inc., 1997, pp. 1-15.
Arbortext, "Arbortext and Accessibilty", http://web.archive.org/web/20021219133536/www.arbortext.com/html/accessibility.html, Dec. 2002, pp. 1-5.
Arbortext, "Arbortext's Support for XSL-FO", http://web.archive.org/web/20021221021632/www.arbortext.com/html/xsl-fo.html. Dec. 2002, pp. 1-4.
Arbortext, "Schemas", http://web.archive.org/web/20021221023148/www.arbortext.com/html/schemas.html, Dec. 2002, pp. 1-3.
Arbortext, "XML Compliance, 100% Pure XML", http:web.archive.org/web/20021209185855/www.arbortext.com/html/xml_compliance, Dec. 2002, pp. 1-3.
Babylon-Pro, http://web.archive.org/web/20021204203634/www3.babylon.com/display.php?id=14&tre . . . , Dec. 4, 2002, 4 pages.
Barrett, Rob, Paul P. Maglio and Daniel C. Kellem; *How to personalize the Web*; Conference proceedings on human factors in computing systems (1997) p. 75-82.
Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12 (Publicly known at least as early as Sep. 26, 2005).
Bischof, Hans-Peter, "Spell, Spellin, Spellout—Finding Spelling Errors", http://www.vorlesungen.uni-osnabrueck.de/informatik/shellscript/Html/Man/_Man_NeXT_html/html . . . , Apr. 21, 1997, 2 pp.
Blaheta et al., "Assigning Function Tags to Parsed Text," Morgan Kaufmann Publishers Inc., 2000, pp. 234-240.
Bonifati A., "Active Behaviors within XML Document Management", EDBT Ph. D. Workshop, Mar. 2000, pp. 1-4.

(56) References Cited

OTHER PUBLICATIONS

Boone, "Concept Features in Re: Agent, An Intelligent Email Agent", Proceedings of the 2nd International Conference on Autonomous Agents, May 9-13, 1998, pp. 141-148.
Bosak, "XML: The Universal Publishing Format", SGML/XML Europe '98, May 1998, pp. A1-C17.
Braganholo V., "Updating Relational Databases Through XML Views", Technical Report, Sep. 2002, pp. 1-61.
Brockschmidt, K., "Inside OLE, Second Edition", 1995, Microsoft Press, p. 169.
Brooks-Bilson, "Programming ColdFusion" [electronic resource] 2001, Safari Tech Books Online, 1st Edition, 25 pp.
Ceri S. et al., "Deriving Production Rules for Incremental View Maintenance", Proceedings of the 17th International Conference on Very Large Data Bases, Sep. 1991, pp. 577-589.
Claris Em@iler Getting Started User's Guide, for Macintosh, Claris Corporation, 1995-1997, 61 pp.
Clark, James, and DeRose, Steve, "XML Path Language (XPath), Version 1.0", W3C, http://web.archive.org/web/2021010034434/http://www.w3.org/TR/xpath, 1999-2000, pp. 1-31.
Corel, "Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.
Corel, "Corel XMetal4, Making XML Content Creation Easy", http://web.archive.org/web/20031118215158/www.corel.com/servlet/Satellite?pagename, Nov. 2003, pp. 1-2.
Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.
Corel® Office Professional 7 Quick Results User's Manual, vol. 1, Version 7.0 (first printing), Corel Corporation, Limited, pp. 1-531 (Publicly known at least as early as Sep. 26, 2005).
Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.
Desmarais, Michel C. and Jiming Liu; *Exploring the applications of user-expertise assessment for intelligent interfaces*; Proceedings of the conference on human factors in computing systems, (1993) p. 308-313.
Devanbue, P. et al., "Chime: customizable hyperlink insertion and maintenance engine for software engineering environments", Software Engineering, Publication date: 1999, ISBN: 1-58113-07400.
Developer's Guide to Apple Data Detectors, for Version 1.0.2., Apple Computer, Inc., 1997, pp. 1-33.
Driza, Scott, "Learn Word 2000 VBA Document Automation", Wordware Publishing Inc., 2001, 6 pp.
Falquet G. et al., "Design and Analysis of Active Hypertext Views on Databases", Information Sciences Institute, Jan. 2002, pp. 1-24.
Fan et al., "FormPlus: A Form Authoring Toolkit", Proceedings of the Fourteenth Annual Computer Software and Applications Conference, Oct. 31, 1990-Nov. 2, 1990, pp. 255-260.
Fernandez M. et al., "SilkRoute: trading between relations and XML", Computer Networks, vol. 33, No. 1-6, Jun. 2000, pp. 723-745.
Flanagan, D., "JavaScript—The Definitive Guide, Fourth Edition", Jan. 2002, O'Reilly, 12 pp.
Foley, James D.; *Future directions in user-computer interface software*; Conference proceedings on organizational computer systems, (1991) p. 289-297.
Foley, Jim; *Integrating computer technology, people technology and application technology; strategies and case studies from Georgia Tech's Graphics, Visualization and Usability Center*; Proceedings of the workshop on advanced visual interfaces, (1994) p. 34-43.
Ford, Bryan, Mike Hibler, Jay Lepreau, Roland McGrath and Patrick Tullman; *Interface and execution models in the fluke kernel*; Proceedings of the third symposium on operating systems design and implementation, (1999) p. 101-115.
Getting Results With Microsoft® Office 97, *Real World Solutions for the Work You Do*, Microsoft Corporation, 1995-1997, pp. 1-703.
Glushko, Robert J., Jay M. Tenenbaum and Bart Meltzer; *An XML framework for agent-based E-commerce*; Commun. ACM 42, 3 (Mar. 1999) p. 106.
Goschka, Karl M. and Jurgen Falb; *Dynamic hyperlink generation for navigation in relational databases*; Proceedings of the tenth ACM conference on hypertext and hypermedia: returning to our diverse roots (1999) p. 23-24.
GuruNet Press—Articles, http://web.archive.org/web/20030619163926/gurunet.com/buzz_articles.html, Jun. 19, 2003, 5 pages.
Harold, E.R., "XML: Extensible Markup Language", IDG Books Worldwide, Books 24x7.com printout, 1998, 20 pp.
Hartson, H. Rex and Deborah Hix; *Human-computer interface development: concepts and systems for its management*; ACM Comput. Surv. 1 (Mar. 1989) p. 5-92.
Hewkin, "Smart Tags-the Distributed-Memory Revolution", Iee Review, Jun. 22, 1989, pp. 203-206.
Homer, Alex et al., Professional Active Services Pages, 1997, Wrox Press Ltd., Section"Client-Side Scripting and Components", subsection "Choosing Your Applets, and Controls", 16 pp.
IBM Corporation, IBM Research Disclosure #368; "Multimedia Hyperlinks Automatically Created for Reference Documents," *IBM Technical Disclosure* Bulletin, Jun. 1993, pp. 1-5.
IBM Technical Disclosure Bulletin, "National Language Support Enablemetn for Culture-Specific Operations", Nov. 1, 1993, vol. 36, Issue 11, pp. 629-638.
*InfoCentral™ 7*, User's Manual, Corel Corporation, vol. 1, Version 7.0, 1996, pp. 1-86.
InteractiveTran™ Interactive Machine Translation, "Interactive Translation and Learning Tool," Date: Mar. 1, 2007, pp. 1-7, http://www.tranexp.com/win/InteractiveTran.htm.
Ispell 4, "Ispell—Format of Ispell Dictionaries and Affix Files", http://www.bigbiz.com/cgi-bin/manpage?4+ispell, 11 pp. (Publicly known at least as early as Sep. 26, 2005).
Johnson, L., "What's So Special About Paste Special?", Jun. 2002, Internet article, XP-002420702, http://pubs.logicalexpressions.com/Pub0009/LPMArticle.asp?ID=40, 5 pgs.
Kristensen, "Template Resolution in XML/HTML", Computer Networks and ISDN Systems, vol. 30, 1998, pp. 239-249.
Kuenning, Geoff, "International Ispell", http://fmg-www.cs.ucla.edu/geoff.ispell.html, 3 pp. (Publicly known at least as early as Sep. 26, 2005).
Kuenning, Geoff, "Using Ispell from emacs", http://theochem.ki.ku.dk/on_line_docs/ispell/ispell_1.html, 4 pp (Publicly known at least as early as Sep. 26, 2005).
Kukich, Karen; *Techniques for Automatically Correcting Words in Text*; ACM Comput. Surv., 24, 4 (Dec. 1992); pp. 377-439.
Lewis, David D. et al., "A Sequential Algorithm for Training Text Classifiers," Spring-Verlag New York, Inc., 1994, pp. 1-10.
Marais, Hannes, "Supporting Cooperative and Personal Surfing With a Desktop Assistant", 1997, ACM Press, pp. 129-138.
Martensson, Bengt, "Thread-Enhanced Spell Front End for GNU Emacs + Detex + Delatex", http://www.geocrawler.com/archives/3/337/1987/8/0/1871981/, Aug. 20, 1987, 1 page.
Marx, Matt and Chris Schmandt; *Putting People First: Specifying Proper Names in Speech Interfaces*; Proceedings of the ACM Symposium on User Interface Software and Technology; 1994; pp. 29-37.
Marx, Matthew and Chris Schmandt; *CLUES: dynamic personalized message filtering*; Proceedings of the ACM 1996 conference on computer supported cooperative work (1996) p. 113-121.
McMahon, Lee. E., "SED—A Non-Interactive Text Editor," Bell Laboratories, Murray Hill, New Jersey 07974, Aug. 15, 1978, pp. 16.
Measuring Units Conversion Table—http://web.archie.org—1997 Internet French Property, pp. 1-4.
Menu Customizing, IBM Technical Disclosure Bulletin, vol. 34, No. 1, Jun. 1991, pp. 91-92 (4 pp. total).
Michael Halvorson et al., Microsoft Office XP Inside Out, Microsoft Press, 2001, 37 pages.
Microsoft Computer Dictionary, Microsoft, Microsoft Press, Fifth Edition, p. 409.
Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

(56) References Cited

OTHER PUBLICATIONS

Multilingual Books, "Word Translator for Windows," Date: Mar. 1, 2007, pp. 1-4, http://www.multilingualbooks.com/wordtranslator.html.
Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.
Novell GroupWise User's Guide for Windows 16-Bit Version 5.2, Novell, Inc., 1993-1997, pp. 1-231.
Novell GroupWise User's Guide for Windows 32-Bit Version 5.2, Novell, Inc., 1998, pp. 1-318.
Online Dictionary Software by Babylon, http://web.archive.org/web/20030122035306/http://www3.babylon.com/, Jan. 22, 2003, 2 pages.
Panagiotis, Christias, Man-cgi 1.15, http://www.calpoly.edu/cgi-bin/man-cgi?spell+1, 1994, 3 pp.
Panagiotis, Christias, Man-cgi 1.15, http://www.physics.umn.edu/cgi-bin/man-cgi?spell, 1994, 5 pp.
Pentland, Alex; *Perceptual user interfaces: perceptual intelligence*; Commun. ACM 43, 3 (Mar. 2000) p. 35-44.
Perry, Brad, et al., "Discovering Similar Resources by Content Part-Linking", Proceedings of the Sixth International Conference on Information and Knowledge Management, published by ACM Press 1997, pp. 317-324.
Pershikov, V.I., "Explanatory Dictionary in Informatics," Finances and Statistics, Moscow, 1991 (in Russian with translated sections) 5 pgs.
Premium Content, http://web.archive.org/web/20031202172231/www.babylon.com/display.php?id=130&tre, Dec. 2, 2003, 2 pages.
Quin, Liam, "Extensible Markup Language (XML)", W3C Architecture Domain, http://web.archive.org/web/2002121962057/http://www.w3.org/XML/, 1996-2002, pp. 1-3.
Rice, F.C., "Transform XML Files with XSLT When Importing into Microsoft Excel 2002," Jul. 2001, Internet article, XP-002420701, http://msdn2.microsoft.com/en-us/library/aa140055(office.10,d=printer).aspx, 9 pgs.
Rubin, Charles, "Microsoft Word 2000 Official Manual," First Edition, Nikkei BP Soft Press, Inc., Aug. 2, 1999, 14 pages (in Japanese with English translation).
Santos, C.A.S., L.F.G Soares, G.L. de Souza and J.P. Courtiat; *Design methodology and formal validation of hypermedia documents*; Proceedings of the sixth ACM international conference on multimedia, (1998) p. 39-48.
Schulz, Charles, "Writing Applications for Uniform Operation on a Mainframe or PC: A Metric Conversion Program", Lockheed Missles & Space Company, Inc., Sunnyvale, CA, May 1990, pp. 348-361.
Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.
Sriram, V., "ComponentXchange: An E-Exchange for Software Components", Master Thesis, CitSeer, May 2001, pp. i-v, 1-77.
Stairmand, Mark A.; *Textual context analysis for information retrieval*; Proceedings of the 20th annual international ACM SIGIR conference on research and development in information retrieval (1997) p. 140-147.
Systran, "Systran Home Translator 2007—The World's Best-Selling Language Translation Software," Date: 2007, pp. 1-2, www.systransoft.com/download/ProductDatasheets/SYSTRAN.Home.Translator.pdf.
Takkinen et al., "CAFÉ: A Conceptual Model for Managing Information in Electronic Mail", Proceedings of the Annual Hawaii International Conference on System Sciences, 1998, pp. 44-53.
Terveen, Loren, Will Hill and Brian Amento; *Constructing, organizing, and visualizing collections of tropically related Web resources*; ACM Trans. Comput.-um. Interact. 6, 1 (Mar. 1999) p. 67-94.

*The Complete LINUX™ Operating System 5.2 Deluxe*, Red Hat,® Macmillian Digital Publishing USA, A Viacom Company, Red Hat Software, Inc., ISBN 1-57595-199-1B, 1995-1998, pp. 1-385.
Toth, V., "Visual C++ 4 Unleashed", 1996, Sams Publishing, p. 174.
Towers, J. Tarin, Visual Quickstart Guide: Dreamweaver 2 for Windows and Macintosh, 1999, Peachpit Press, pp. 150-151.
Tsai, M., P. Reiher and G.J. Popek; *Command management system for next-generation user input*; Proceedings of the seventh workshop on hottopics in operating systems, (1999) p. 179-84.
TwinBridge Software Corporation, "TransWhiz English/Chinese Bi-directional Translation V9.0 Standard," Date: Mar. 1, 2007, pp. 1-8, http://www.twinbridge.com/detail.aspx?ID=132.
*User Manual for AddressMate and AddressMate Plus*, CoStar Corporation, Address Mate Software, 1994-1995, pp. 1-210.
Wei Ying-bin et al., "A New Technology ColdFusion of Realizing Dynamic Webpage," 2000, 6 pgs. (English language translation, pp. 1-6).
Why GuruNet, http://web.archive.org/web/20030602200950/http://www.gurunet.com/whygurunet.html, Jun. 2, 2003, 3 pages.
Wilker, John, "ColdFusion MX Adds J2EE, XML, and Web Services Compatibility", Aug. 9, 2002, http://builder.com.com/5102-6387-104585.html, 3 pp.
Willisson, Pace, Ispell (1), "User Commands", http://www.csee.usf.edu/cgi-bin/man-cgi?ispell, 1983, 18 pp.
Willisson, Pace, Ispell (1), http://www.rt.com/man/findaffix.l.html, 1983, 15 pp.
World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.
World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.
"XML Schema Part 2: Datatypes," W3C, May 2, 2001, http://www.w3.org/TR/2001/REC-xmlschema-2-20010502/, pp. 147.
C. Heinemann, "Cross-Reference your XML Data," Microsoft Corporation, Dec. 7, 1998, 6 pgs.
Camarda, B., Special Editing Using® Microsoft® Office Word 2003, Que, Dec. 12, 2003, pp. 1-5.
D. Obasanjo, "XML_Namespaces and How They Affect Xpath and XSLT," Microsoft Corporation, May 20, 2002, 19 pgs.
Doroth, V. et al., "Modern Computer Vocabulary," St. Petersburg, BHV-Peterburg, 2001, p. 465 (with English language translation).
European Communication Minutes of Oral Proceedings and Decision dated Sep. 15, 2008 in European Application No. 05 000 506.5-1527.
European Communication Summons to Attend Oral Proceedings dated May 7, 2008 cited in European Application No. 04002224.6.
Frye, C., Microsoft Office Systems: Step by Step, Microsoft Press, 2003 Edition, Sep. 3, 2003, pp. 1-6.
Ghamrawi et al., "Collective Multi-Label Classification," ACM, 2005, pp. 195-200.
Harmon, D., "Microsoft MapPoint 2002," Geoworld Quick-Take Reviews, Aug. 2001, 3 pp.
Irie R. et al., "Resources for Place Name Analysis," May 28, 2004, 4 pp.
Ivens, K., Office XP Smart Tags, Microsoft, Mar. 6, 2002, pp. 1-4.
Koyaku, H., "What is Brought to SQL Server 2000 by XML, Part 1: Function of XML Provided by SQL Server 2000," Enterprise Servers World, vol. 3, No. 12, IDG Japan, Inc., Dec. 1, 2000, pp. 42-53.
M. Stowe, "XML in Excel and the Spreadsheet Component," Microsoft Corporation, Aug. 2001, 6 pgs.
Oviatt et al., "Integration and Synchronization of Input Modes during Multimodal Human-Computer Interaction," CHI 97, Atlanta, Georgia, Mar. 22-27, 1997, pp. 415-422.
Pixley, "Document Object Model (DOM) Level 2 Events Specification Version 1.0," World Wide Web Consortium, Nov. 13, 2000, www.w3.org/TR/2000/REC-DOM-Level-2-Events-20001113/DOM2-Events.pdf.
Rajabifard, A. et al., "Creating an Enabling Platform for the Delivery of Spatial Information," Spatial Sciences Institute Biennial Conference, Sep. 12, 2005, 10 pp.

(56) References Cited

OTHER PUBLICATIONS

Rubin, Charles, "Microsoft Word 2000 Official Manual," First Edition, Nikkei BP Soft Press, Inc., Aug. 2, 1999, pp. 215-217.
Hara, T. et al., "Inside Microsoft.NET-Complete Explanation, 'What Microsoft Aims For'", msdn magazine, No. 6, pp. 20-35, ASCII, Japan, Sep. 18, 2000, 19 pp.
Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English translation).
Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese—no translation yet).
Rees, M., "User Interfaces for Lightweight In-line Editing of Web Pages," *IEEE*, 7 pages (2000).
Tanaka, S., "Verifying the XML Schema Definition," *XML Magazine*, Shoeisha Co., Ltd., vol. 10, No. 3, Jul. 1, 2000, pp. 135-155 (no English translation) (60001.0211JP01).
Randolph, Gary, "User-Cases and Personas: A Case Study in Light-Weight User Interaction Design for Small Development Projects," Informing Science, 2004, vol. 7, pp. 105-116.
Robbins, Christopher, "Extensible MultiModal Environment Toolkit (EMMET): A Toolkit for Prototying and Remotely Testing Speech and Gesture Based Multimodal Interface," Sep. 2005, Department of Computer Science, New York University, pp. 1-190.
U.S. Office Action dated Oct. 13, 2010 in U.S. Appl. No. 11/803,689.

\* cited by examiner

FIG.15.

| REQUEST ID | TRACKING /ORIGIN | TRACKING/ DESTINATION | RETURN FORMAT/ TYPE | RETURN FORMAT/ LANGUAGE | QUERY/ ORIGINAL | QUERY/ KEYWORDS | QUERY/ CONTEXT |
|---|---|---|---|---|---|---|---|
| 1510 | 1520 | 1530 | 1540 | 1550 | 1560 | 1570 | 1580 |

| QUERY ID | PROVIDER ID | RESULT BLOCK FROM SERVICE 1 | RESULT BLOCK FROM SERVICE 2 |
|---|---|---|---|
| 1610 | 1620 | 1630 | 1640 |

1700
- 1710 PROTOCOL VERSION NUMBER
- 1720 PROVIDER REVISION
- 1730 INFORMATION REQUEST FLAG

FIG.18.

1800
- 1810 PROVIDER ADDRESS
- 1820 PROVIDER NAME
- 1830 PROTOCOL VERSION NUMBER
- 1840 PROVIDER REVISION
- 1850 PROVIDER PROPERTIES
- 1860 SERVICE LIST
- 1870 LANGUAGE SKU
- 1880 COUNTRY SKU

FIG.19.

1900
- 1910 SERVICE NAME
- 1920 CATEGORIES
- 1930 SERVICE RECOGNIZER

METHOD, SYSTEM, AND APPARATUS FOR ROUTING A QUERY TO ONE OR MORE PROVIDERS

TECHNICAL FIELD

Embodiments of the present invention relate to the field of routing queries to providers of information. More particularly, embodiments of the invention relate to the field of routing a query, based on content and context, to one or more providers offering one or more services.

BACKGROUND

The Internet has generated a proliferation of providers of information ("providers"). Each provider may offer one or more information stores ("services") that a user may search to locate relevant information. Such providers may offer their content for free or for payment. For example, there are many well known providers that attempt to catalog and allow a user to search for relevant information on the Internet, such as, for example, THE MICROSOFT NETWORK® online service (http://www.msn.com). Many specialized providers offer premium content for payment, such as, for example, the LEX-ISNEXIS™ online service (http://www.lexis.com).

Several systems allow a user to select and search multiple providers by entering a single query and sending that query to each of the providers. The results from the multiple providers are presented to the user to sift through and select relevant information. Examples of these types of systems include DOGPILE® online service (http://www.dogpile.com) and CNET's SEARCH.COM online service (http://www.search.com).

Although these types of systems allow a user to query multiple providers and multiple services at one time, the systems do not provide any intelligence in the selection and routing of the queries to the multiple providers. The systems package the query and route it to each of the providers selected by the user and present the results from the providers to the user.

In addition, the interfaces provided for these types of systems are not integrated with other applications. For example, the systems are typically accessed over the Internet by using a web browser. The interfaces for these systems are not directly accessible within applications such as word processors, spreadsheets, and email clients.

Therefore, in light of the above, there is a need for a method, system, and apparatus for routing a query, based on content and context, to one or more providers offering one or more services.

SUMMARY

Embodiments of the present invention solve the above-described problems by providing a method, system, and apparatus for routing a query, based on content and context, to one or more providers offering one or more services.

According to one embodiment of the present invention, a system is provided for routing a query to one or more providers. According to this embodiment, the system includes a service recognizer for a particular provider capable of receiving and analyzing the query to determine if the particular provider is a match for the query. The system also includes a query router for routing the query to the particular provider if the particular provider is determined to be a match.

According to another embodiment of the present invention, a method is provided for routing a query to one or more providers. According to this embodiment, the method includes steps of receiving the query from a user and determining which of the one or more providers are a match for the query. The method further includes sending the query to one or more particular providers of the one or more providers that are determined to be matches for the query and blocking the query to specific providers of the one or more providers that are determined not to be matches for the query.

According to another embodiment of the present invention, a system is provided for communication between a client and one or more providers. According to this embodiment of the invention, the system includes a search processor capable of receiving and parsing a query and generating a standardized query. The system also includes a query router for routing the standardized query to one or more of the one or more providers and a results processor capable of receiving results from one or more of the one or more providers and presenting the results to a user.

According to yet another embodiment of the invention, a method is provided for updating information about a particular provider on a client. According to this embodiment, the method includes steps of sending a registration query to the particular provider and receiving a registration result of the registration query from the particular provider. The method also includes a step of updating registration information for the particular provider on the client based on the registration result.

According to another actual embodiment of the present invention, a system is provided for routing a query to one or more providers. According to this embodiment, the system includes a search interface capable of presenting a service list including one or more services offered by the one or more providers, permitting selection of one or more of the one or more services, and a query entry for receiving input of the query, wherein the service list is categorized according to one or more research categories, each of the one or more research categories including at least one service from the one or more services. The system also includes a search processor capable of receiving and parsing the query, breaking the query into one or more terms, stemming each of the one or more terms, spell checking each of the one or more terms, and generating context for the query based on the origin of the query.

According to this embodiment, the system may also include a service recognizer for a particular provider capable of receiving and comparing each of the one or more terms of the query to a keyword list to determine if the particular provider is a match for the query. A query router is included for routing the query to the particular provider if the particular provider is determined to be a match and blocking the query to the particular provider if the particular provider is determined not to be a match. A results interface may be included that is capable of presenting results of the query.

According to another embodiment of the present invention, a method is provided for routing a query to one or more providers. The method may include steps of receiving the query and determining which of the one or more providers that are selected are a match for the query by comparing one or more terms of the query to a keyword list. The method may also include steps of sending the query to one or more particular providers of the one or more providers that are determined to be matches for the query, and blocking the query to specific providers of the one or more providers that are determined not to be matches for the query. In addition, the method may include presenting results of the query, and suggesting a provider from the one or more providers that was not selected and that is determined to be a match for the query.

These and other details regarding the various embodiments of the invention will become more apparent from the detailed description that follows.

DESCRIPTION OF THE DRAWINGS

FIG. 15 is a block diagram that shows a data structure for a search request to a provider made in accordance with one embodiment of the present invention;

FIG. 16 is a block diagram that shows a data structure for a search response from a provider made in accordance with one embodiment of the present invention;

FIG. 17 is a block diagram that shows a data structure for a provider information update request made in accordance with one embodiment of the present invention;

FIG. 18 is a block diagram that shows a data structure for a provider information update response made in accordance with one embodiment of the present invention; and FIG. 19 is a block diagram that shows a data structure for a provider service registration information made in accordance with one embodiment of the present invention.

DETAILED DESCRIPTION OF AN ILLUSTRATIVE EMBODIMENT

As described briefly above, embodiments of the present invention provide a method and system for routing a query to one or more providers. In the following detailed description, references are made to the accompanying drawings that form a part hereof, and in which are shown by way of illustration of specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
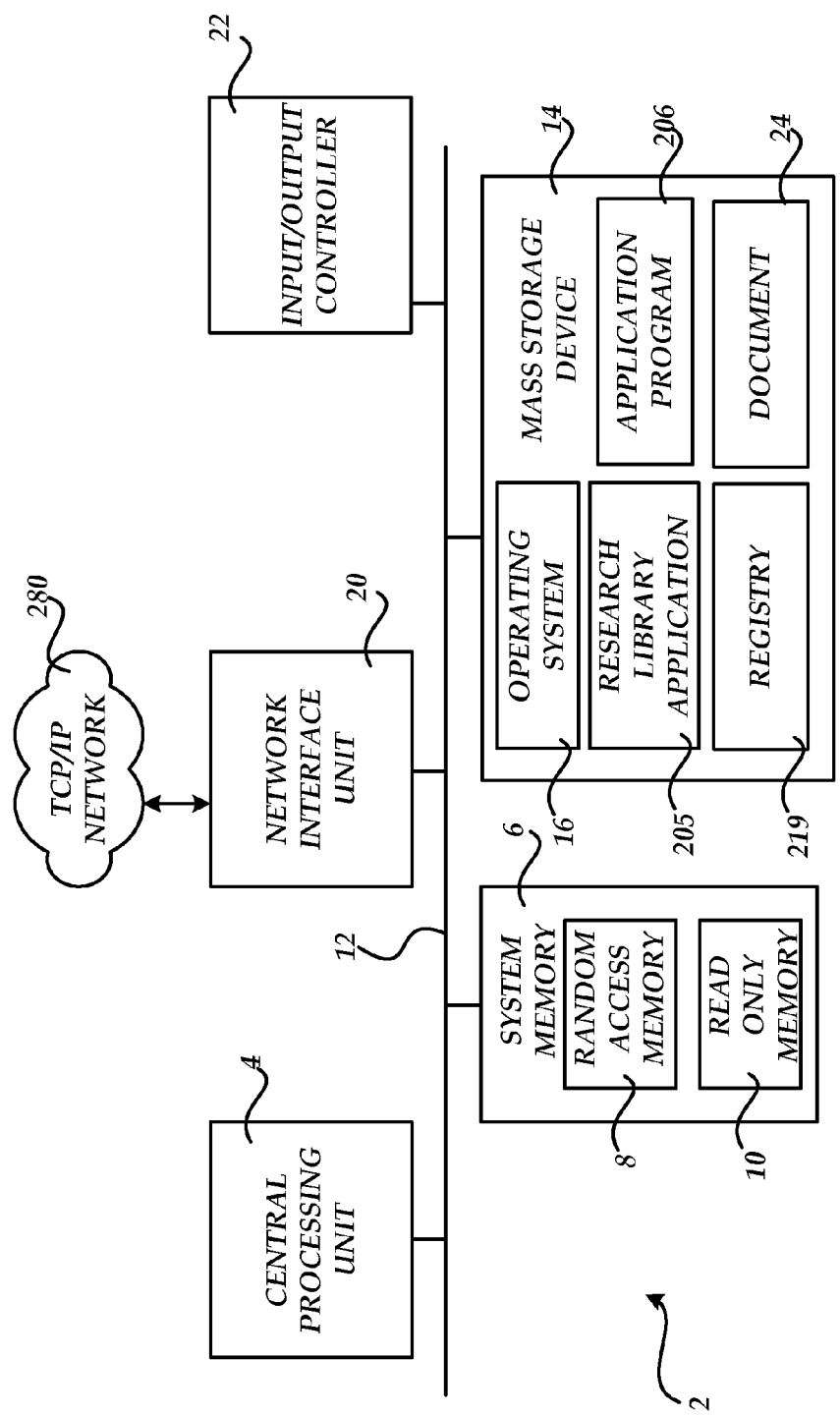
FIG. 1 is a block diagram showing the architecture of a personal computer that provides an illustrative operating environment for embodiments of the present invention.

Referring now to the drawings, in which like numerals represent like elements throughout the several figures, aspects of the present invention and the example operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as a research library application 205, and data.

The mass storage device 14 is connected to the CPU 4 through a mass storage controller (not shown) connected to the bus 12. The mass storage device 14 and its associated computer-readable media provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a network 280, such as the Internet. The personal computer 2 may connect to the network 280 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store the research library application 205 that is used for connecting to and communicating with one or more providers. In addition, one or more additional application programs, such as, for example, application program 206, may be included. The application program 206 may be a word processing, spreadsheet, electronic email, or other program. The electronic document 24 may comprise a file in that a user may input information that may be viewed, stored, printed, or otherwise manipulated. Application programs for creating and editing other types of electronic documents may also be used with the various embodiments of the present invention.

The research library application 205 may comprise a client that is configured to connect to and communicate with one or more local or remote providers of information ("providers"). In addition, the research library application 205 may comprise a plug-in for use in connection with one or more other programs, such as, for example, an Internet browser such as INTERNET EXPLORER from MICROSOFT CORPORATION of Redmond, Wash. The research library application 205 may comprise multiple modules.

The mass storage device 14 and RAM 8 of the personal computer 2 may also include a registry 219 or other database or indexing program to maintain information and parameters associated with the applications and other components that comprise the personal computer 2. For example, the registry 219 may include configuration options associated with the research library application 205, as described below.

Embodiments of the present invention relate to the field of routing queries to providers of information. More particularly, embodiments of the invention relate to the field of routing a query, based on content and context, to one or more providers offering one or more services.

As used herein, the term "information" means data that may be desirable to a user in any form. As used herein, the term "provider" means a supplier of information. Each provider may offer one or more services. As used herein, the term "services" means a specific instance, conglomeration, or database of information. One or more of the providers, including one or more of the services, may reside on the personal computer 2 (i.e., client-side providers), or may reside at a remote site (i.e., server-side providers) and be available through a network such as, for example, a local area network ("LAN"), wide area network ("WAN"), the Internet, or another type of network.

Figure 2:
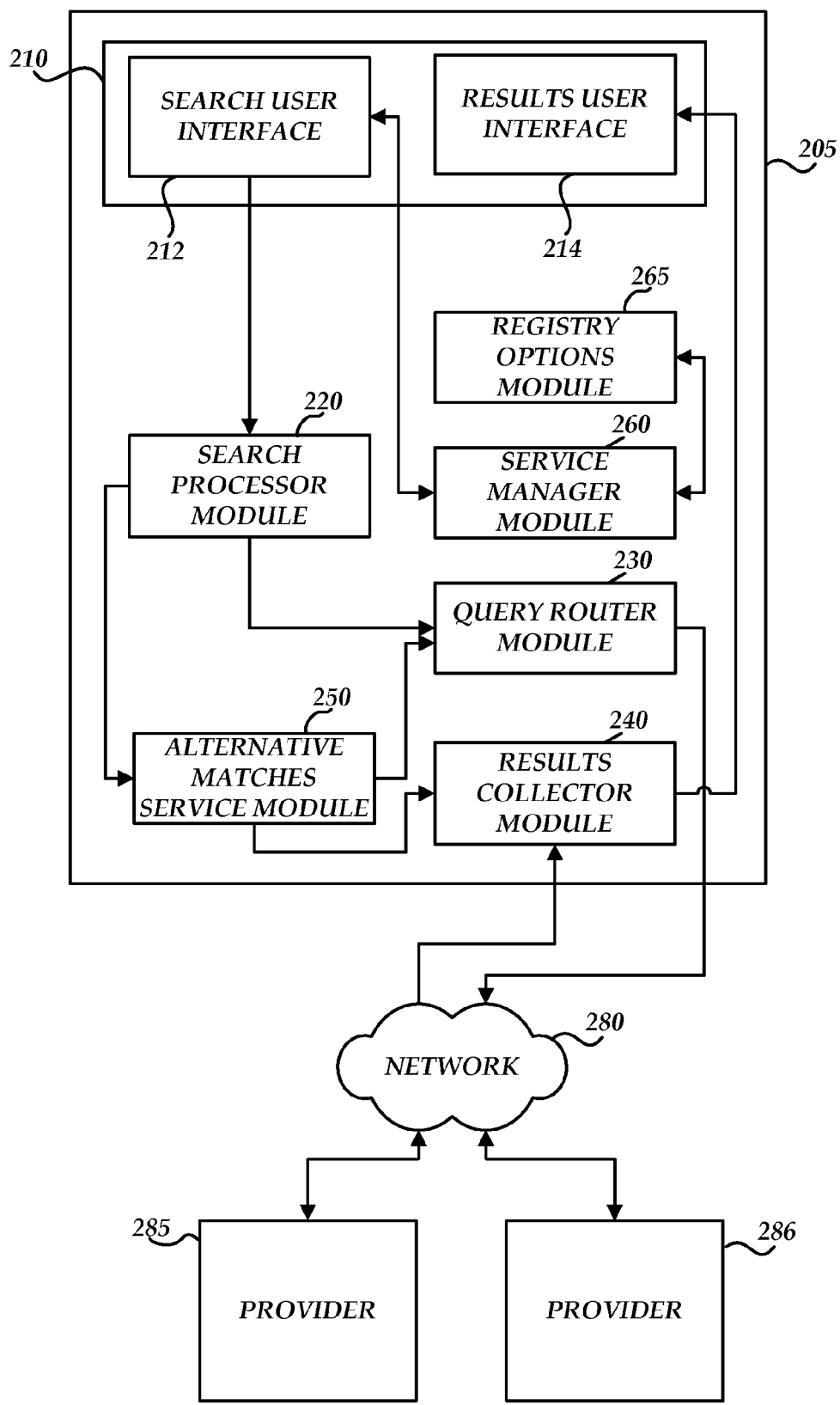
FIG. 2 is a block diagram that shows a software architecture for routing a query to one or more providers according to various embodiments of the present invention.

Referring now to FIG. 2, an example software architecture and environment for use in conjunction with the various embodiments of the present invention will be described. The architecture shown in FIG. 2 includes the research library application 205. The research library application 205 may include one or more modules and submodules, as shown. In addition, the research library application 205 may be coupled directly or indirectly through a network such as a LAN, WAN, or the Internet, to one or more providers 285 and 286. As described in more detail below, the providers 285 and 286 may each include one or more services.

The research library application 205 generally includes a user interface 210 comprising a search user interface 212 and a results user interface 214. The user interface 210 generally provides an interface between the research library application 205 and a user. The user interface 210 may be coupled to a search processor module 220, which is, in turn, coupled to a query router module 230. The search processor module 220 may process a query entered by the user, the processing including, for example, work breaking, stemming, spell checking, and context generation, as described below. The query router module 230 can analyze the query and route the query to one or more of the providers based on the analysis, as described below.

The query router module 230 may be coupled by the network 280, using, for example, such standard communication protocols as TCP/IP, hypertext transfer protocol ("HTTP"), or eXtensible Markup Language ("XML"), to one or more of the providers 285 and 286. A results collector module 240 is coupled to the network 280 to receive data from the providers 285 and 286. The results collector module 240 is, in turn, connected to the results user interface 214 used to present the results of the search.

The search processor module 220 is also coupled to an alternative matches service module 250. The alternative matches service module 250 may be, for example, coupled to the query router module 230 and/or the results collector module 240, and may suggest alternative search possibilities to the user. In addition, the search user interface 210 is coupled to a service manager module 260, which is, in turn, coupled to a registry options module 265. The service manager module 260 may manage a list of the one or more providers and the one or more services. The registry options module 265 may manage a list of the one or more providers and one or more services and may also store one or more configurable settings for the research library application 205.

Each of the components shown in FIG. 2 is described in greater detail below.

Figure 3:
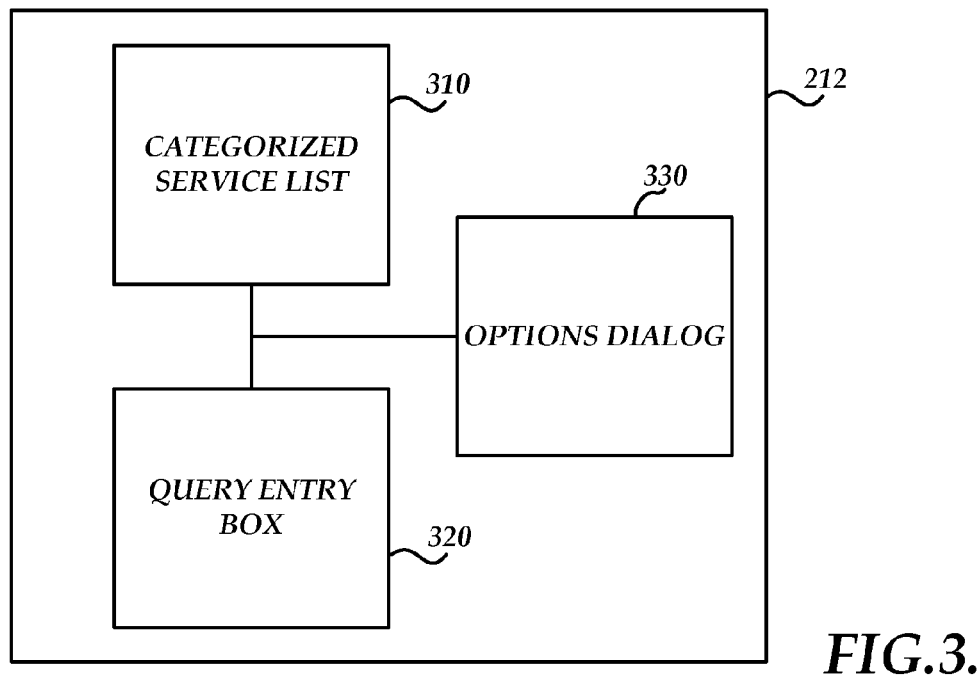
FIG. 3 is block diagram that shows a search user interface made in accordance with one embodiment the present invention.

Referring now to FIG. 3, the search user interface 212 will be described in greater detail. The search user interface may include a categorized service list 310, a query entry box 320, and an options dialog box 330.

The categorized service list 310 is list of services that are available to be searched. The list may be grouped into one or more categories according to the information provided by different providers and/or services. For example, typical categories may include, without limitation, reference books, research sites, intranet sites and portals, file search, etc. A user may select a specific category to search, the category including one or more services from one or more providers. Alternatively, the user may select one or more specific providers and/or services to search.

The query entry box 320 allows a user to enter a query. The query entry box 320 accepts alphanumeric characters that together represent the query string. Alternatively, if the query string is passed from another program, such as the application program 206, it is not necessary for the user to enter the query in the query entry box 320. For example, a user may pass a query from a word processor application by highlighting a portion of the text in the word processing document and selecting one or more action items from a menu to initiate a search based on the highlighted text.

The options dialog box 330 allows a user to configure the research library application 205 as desired and is controlled by a user settings module 1020, described below. A physical representation of an example graphical user interface including one embodiment of the search user interface 212 is shown in and described with reference to FIG. 9.

Figure 4:
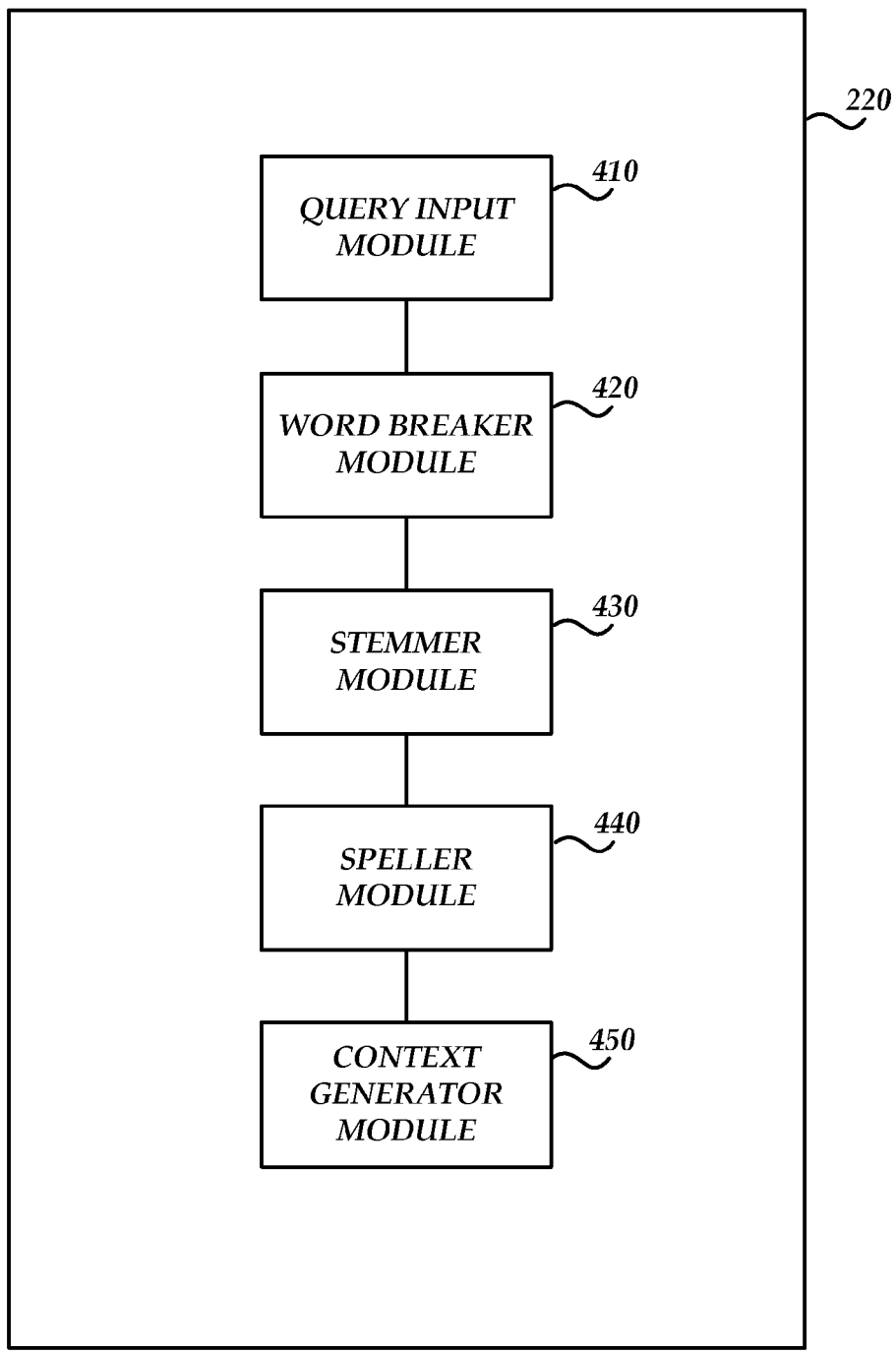
FIG. 4 is a block diagram that shows a search processor module made in accordance with one embodiment of the present invention.

The components that comprise the search processor module 220 are shown in detail in FIG. 4. The modules may include a query input module 410, a word breaker module 420, a stemmer module 430, a speller module 440, and a context module 450. The query input module 410 accepts the query string from the search user interface 210. The query input module 410 passes the query string to the word breaker module 420.

The word breaker module 420 breaks the query string into one or more query terms, depending on the length of the query string. For example, if the query string includes three separate words, the word breaker module 420 will break the query string into three query terms. The word breaker module 420 may, for example, call one or more libraries, such as a dynamic link library ("DLL"), to assist in the breaking of query strings written in various languages. For example, and without limitation, query strings in English, Spanish, German, Swedish, Polish, Japanese, Korean, Chinese, and Thai may be split into respective query terms by the word breaker module 420. The query terms are then passed to the stemmer module 430

The stemmer module 430 processes each query term to identify variations in stemming for each query term. For example, the stemmer module 430 may process a query term "run" and develop a query that includes "ran," "runs," and "running," so that the search is expanded to include obvious variations in query terms. Stemming for multiple languages may be supported using DLLs. The query terms are then passed to the speller module 440.

The speller module 440 spell checks each query term to identify possible misspelled query terms. The speller module 440 may flag possible misspelled words and suggest correct spellings to the user. Alternatively, the speller module 440 may automatically correct misspelled query terms before the terms are sent to the providers. The speller module 440 may also generate a confidence value, which consists of a numerical value within a given range representing a level of confidence that the query term is misspelled and that the suggested word is actually what should replace the misspelled query term. The query terms are then sent, along with any suggested replacement spellings, to the context generator 450.

The context generator 450 identifies the context from which the query is generated. For example, if the query is generated and sent from a word processor, the context generator 450 may introduce information regarding the source of the query (e.g., the word processor, its version number, operating system, etc.). In addition, other context such as the text surrounding the query terms may also be identified by the context generator 450.

The search processor module 220 may also provide other functionality. For example, the search processor module 220 may include one or more modules to determine linguistic characteristics of a query. The linguistic characteristics may include the language in which the query is written and other grammatical characteristics of the query.

Figure 5:
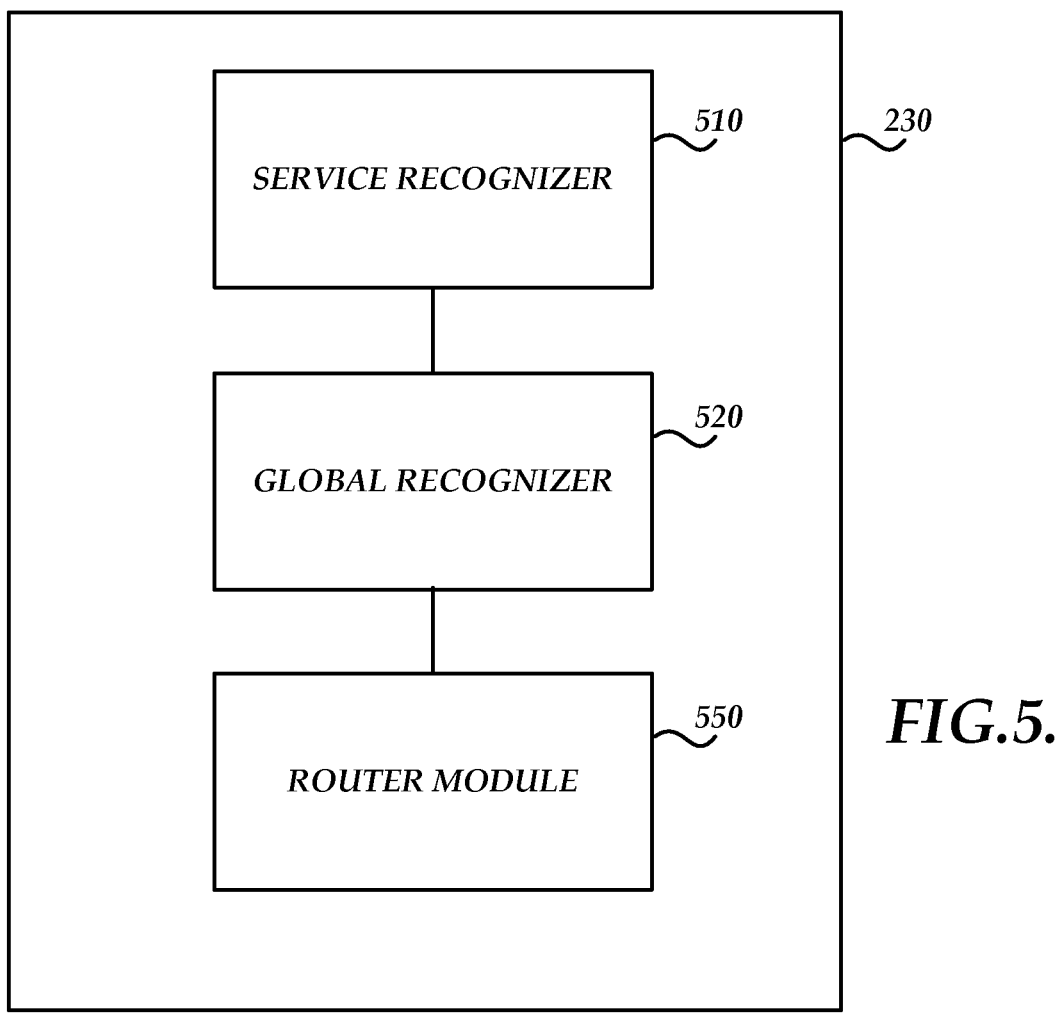
FIG. 5 is a block diagram that shows a query router module made in accordance with one embodiment of the present invention.

Referring now to FIG. 5, the query router module 230 will be described in greater detail. The query router module 230 includes one or more service recognizers 510, a global recognizer 520, and a router module 550. Each service that is identified in the registry 220 of the personal computer 2 includes a service recognizer 510. The service recognizer 510 may include a list of terms or phrases that describe the contents of the service and allow the service recognizer 510 to determine if the service would be a good fit for a particular search query. As used herein, the phrase "good fit" means that a particular service is likely to have relevant information based on an analysis by a service recognizer of the content of a query.

If the service recognizer 510 for a particular service determines that a query would be a good fit for the service, the query is passed to the router module 550. Alternatively, if the particular service determines that a query would not be a good fit for the service, the query is blocked for that particular service.

The global recognizer 520 includes logic that applies to all services. For example, the global recognizer 520 may include lists of words that will not be searched. This may be beneficial, for example, to implement a system to handle the blocking of offensive content. In addition, the global recognizer 520 may also be augmented to check that the query is well formed. Further, the global recognizer 520 may also make determinations based on the content of a query string, such as, for example, determining if a query includes a phone number by identifying a seven-digit number that is separated by dashes or parentheses.

The router module 550 facilitates the routing of the query to one or more services of one or more providers. For example, the router module may package the query into a standard XML search request, as described below with reference to FIG. 15.

Figure 6:
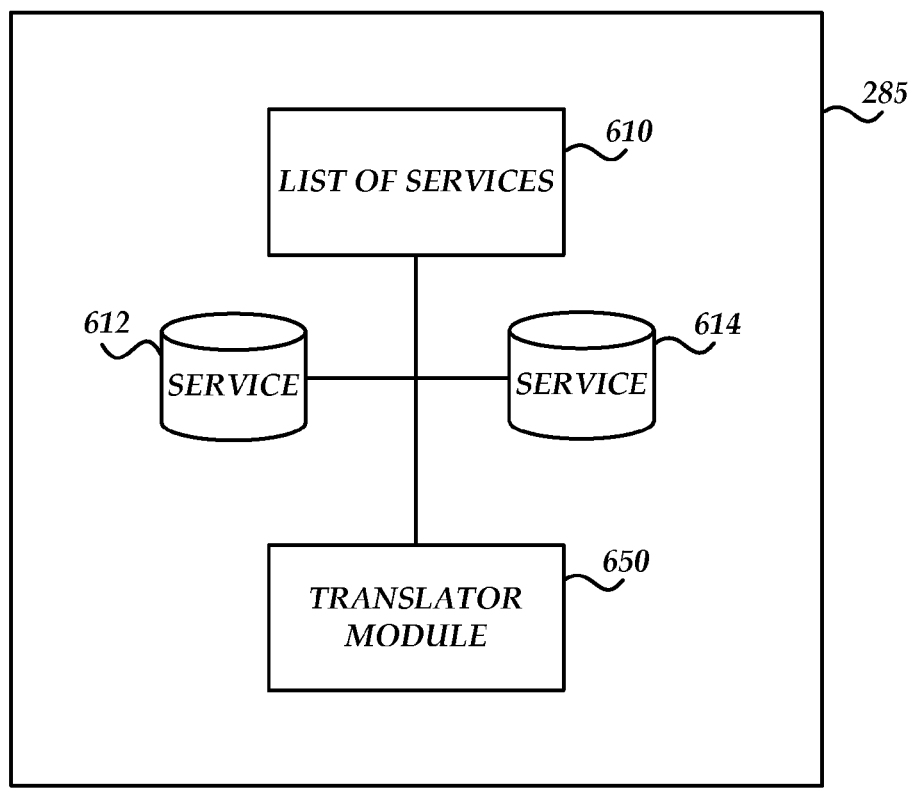
FIG. 6 is a block diagram that shows a provider made in accordance with one embodiment of the present invention.

Referring now to FIG. 6, an illustrative provider 285 will be described. The provider 285 is a server-side provider because it resides on a remote server and is connected to the research library application 205 through the network 280. A server-side provider may be located on an intranet and made available through a LAN or WAN, or may be located on a remote server and made available through the Internet. Alternatively, as noted above, client-side providers residing on the personal computer 2 are also possible and may be structured similarly to server-side providers. An unlimited number of providers may be used.

The provider 285 includes a list of services 610 that includes an entry for each service that the provider 285 offers. Example services 612 and 614 are illustrated. The provider also includes a translator module 650, if needed, to translate search requests from the research library application 205.

According to one embodiment, the provider 285 may return a synopsis of each search result that may be relevant to the query, such as, for example, a title and a short synopsis. The provider 285 may also provide additional information related to each search result such as, for example, the cost associated with viewing, accessing, or downloading each search result. In addition, a provider 285 may also return "rich" data, which may include formatting and forms which allow a user to filter results of the search.

According to various other embodiments, the provider 285 may also return results other than search results. For example, if the provider fails to have any relevant search results for a given query, the provider 285 can return a null search result set. Further, if a test query (described below) has been sent, the provider 285 can return a positive or negative test search result depending on whether or not the provider 285 contains relevant information.

The research library application 205 is configured to communicate with one or more providers including one or more services. Each provider may be configured in a different manner. Therefore, the illustrative provider 285 is only an example configuration. Any configuration is possible for a provider 285 as long as the provider can interpret the query sent by the query module 230 of the research library application 205 and return results that can be interpreted by the results collector module 240.

Figure 7:
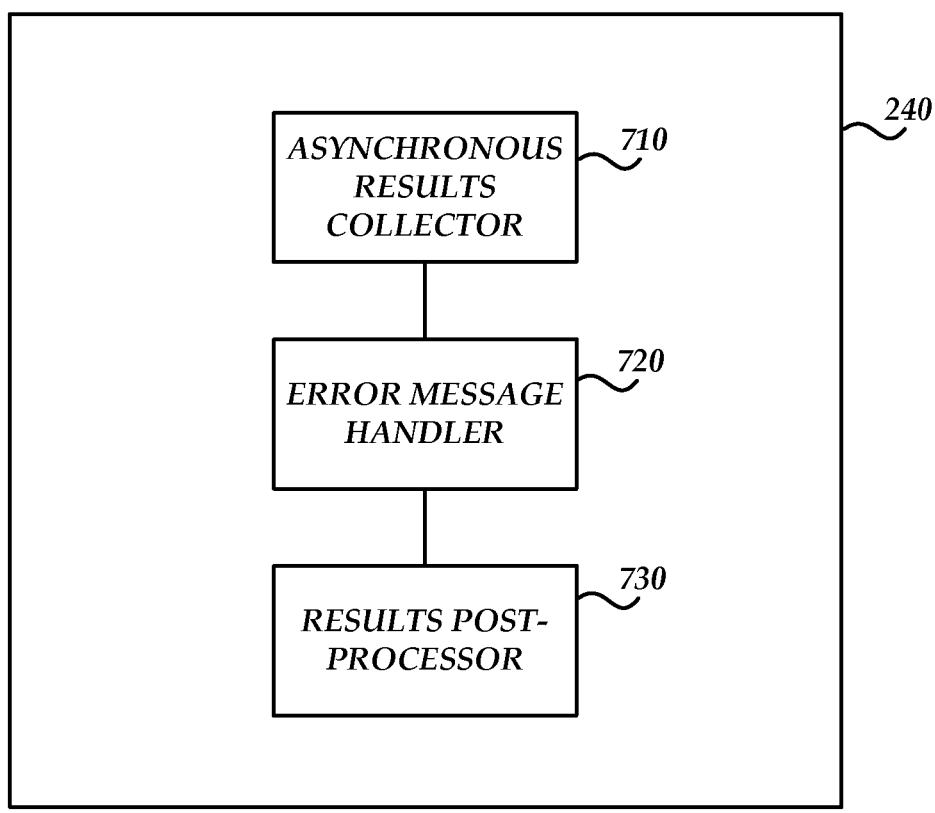
FIG. 7 is a block diagram that shows a results collector module made in accordance with one embodiment of the present invention.

Referring now to FIG. 7, an illustrative results collector module 240 will be described. The results collector module 240 may comprise modules including an asynchronous results collector 710, an error message handler 720, and a results post-processor 730.

The asynchronous results collector 710 collects the search results, such as a standard XML search result described with reference to FIG. 16 below, sent by the one or more providers. The asynchronous results collector 710 then forwards the results to the results user interface 214 for display. In the illustrative embodiment, the asynchronous results collector 710 provides the search results asynchronously, so that the results can be displayed as the results are received.

The error message handler 720 is configured to handle error messages returned from the providers. For example, if the provider 285 does not have any relevant information and returns a null search result, the error message handler 720 will process this result and cause the results user interface 214 to indicate that the particular provider 285 has no relevant information for a given query. Other error messages may include, without limitation, a failure to connect to the particular provider or service, a failure in authentication for a particular service, a failure to receive a response from the particular service in a configurable amount of time, or a failure to provide a query in a format that could be interpreted by the service.

In one embodiment, the results from the search results are returned asynchronously to the results user interface 214 as received by the results collector 240, and the results are presented according to the provider from which they originated. Optionally, the results post-processor 730 may processor the search results from multiple providers to present the results in alternative formats. For example, the results post-processor 730 may combine the results from two or more services, removing duplicate results and listing the most relevant results first. The results post-processor 730 could also, for example, segregate free results from those for which the user may have to pay to view, access, or download.

Figure 8:
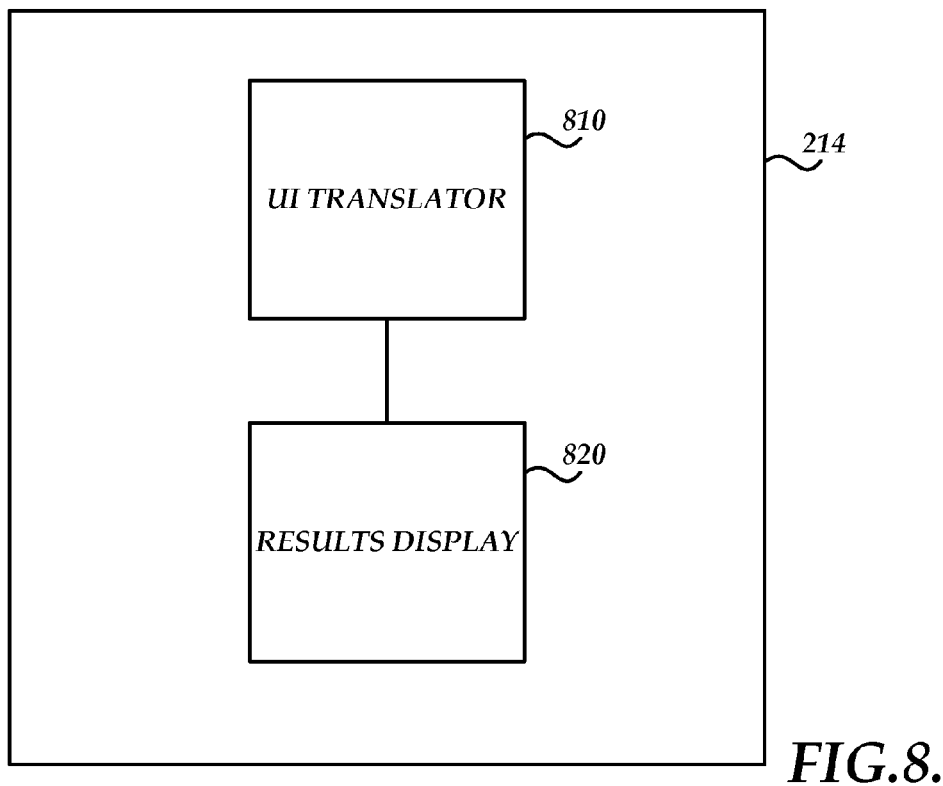
FIG. 8 is a block diagram that shows a results user interface module made in accordance with one embodiment of the present invention.

Referring now to FIG. 8, the results user interface 214 displays the results from the search query and may include a UI translator 810 and a results display 820. The UI translator 810 translates the results from the provider to a display format to be displayed. Any display format can be used, such as, for example, text, hypertext markup language, etc.

Depending on how the results collector module 240 is configured, the results may be displayed according to the provider and/or service from which they came, or the results may be displayed in combination according to their relevance.

The results display 820 displays the results to the user. A physical representation of an example graphical user interface including one embodiment of the results display 820 of the results user interface 214 is shown in and described with respect to FIG. 9. Alternatively, as described further below, the results may also be displayed in context within an application program, such as application program 206, so that a user may initiate a query and receive results without leaving the application program 206.

Figure 9:
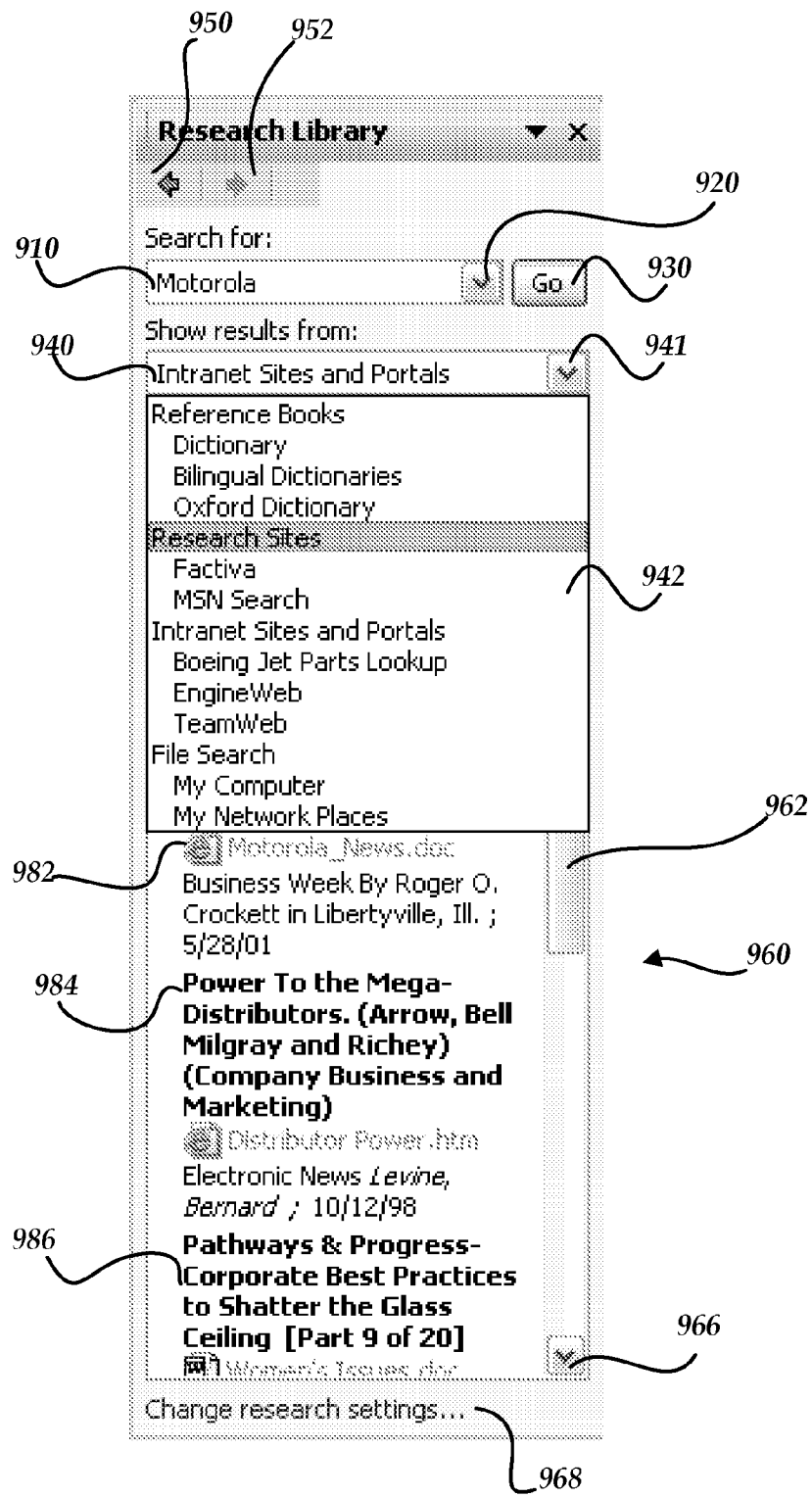
FIG. 9 is a screen diagram showing a graphical user interface made in accordance with one embodiment of the present invention.

Referring now to FIG. 9, an example embodiment of a graphical user interface ("GUI") utilized in various embodiments of the invention will be described. In one embodiment, the search user interface 212 and the results user interface 214 are combined into a single interface. However, it is possible that the two interfaces can be separated. In alternative embodiments, the GUI may be implemented as part of the application program 206, as described below. The GUI may include a variety of components, each described in detail below.

A query box 910 provides a place for a user to enter a query. The query box 910 accepts alphanumeric characters and may be limited in length, if desired. For example, the query box 910 in the example embodiment is limited to 255 Unicode characters. However, queries of greater length are also possible. The query box will also accept standard search operators such as, for example, wildcard characters (e.g., "?" (single character) and "*" (multiple character)), boolean characters (e.g., "+" (AND), "~" (OR), and "−" (NOT)), and phrases enclosed in quotations. If a query is sent from another application (for example, using the method of highlighting text and then selecting one or more action items from a menu), such as application program 206, to the research library application 205, it is unnecessary for the user to enter the query in the query box 910.

A previous query dropdown 920 allows a user to view and select from previous queries. A "Go" button 930 allows the user to initiate a search once the query has been entered in the query box 910. The user may alternatively hit the Enter key on the user's keyboard. Once a search has been initiated, the button 930 changes to a "Stop" button, so that a user may terminate a search, if desired. A user may also terminate a search by entering a new query in the query box 910 and hitting the "Go" button 930. The button 930 may be disabled if there is no text in the query box 910.

A source box 940 includes a source filter dropdown 941 with a source drop box 942 that allows the user to select among different categories and/or services to search. In the example embodiment, the following categories are used: Reference Books, Research Sites, Intranet Sites and Portals, and File Search. Other categories can be added depending on the type of providers available. Subcategories under each category may also be defined. Under each category and/or subcategory, one or more providers and/or services may be listed, as shown. If the category or provider/service within the source box 940 is changed after a query has been completed, a new search will be generated with the same query for the new category or provider/service selected.

Navigational forward and backward buttons 950 and 952 allow the user to move forward and backward between searches. Additional navigation buttons may include dropdown menus to allow for the selection of previous queries based on the previous query text. Typically, previous searches will be cached so that it is unnecessary to run the same query multiple times in a single session.

The results of a query are displayed in the results area 960 (note that the source drop box 942 is temporarily covering a portion of the results area 960). The results area 960 includes a scroll bar 962, an up arrow (temporarily covered by the source drop box 942), and a down arrow 966 that appear when the results are too long for a single results area pane, thereby requiring scrolling to view all of the results. A change research settings link 968 at the bottom of the results area 960 allows access to the options dialog box 330.

Within the results area 960, the results of the search are displayed in a hierarchy. The top level of the hierarchy is the provider names. A short search status may be presented next to the provider name. For example, if the provider is unavailable, the short search status may indicate "Unavailable." More detailed search status may be provided below the provider name. For example, if the provider is unavailable, the detailed search status may state, "This service is currently not available. Please try again later." If a provider does return search results, the number of results may be displayed, such as "(1-5 of 20)."

Below the provider names may be service names, if a provider has more than one service. Underneath the service names are the results of the query 982, 984, and 986. The services and results displayed under each provider may be expanded and collapsed, as desired. Under each result, a synopsis of the result may be provided, along with, for example, an icon representing the type of document and a price for viewing, accessing, and/or downloading the result. Other information and or action may be provided in the results area 960. For example, a particular graphic associated with a particular provider and/or service may be displayed along with the results from the provider and/or service.

Referring again to FIG. 2, aspects of the alternative matches service module 250 and service manager module 260 will be described. The alternative matches service module 250 receives information regarding the query from the search processor 220 and may suggest enhancements for the query to the user. For example, if the search processor 220 indicates that one or more query terms may be misspelled, the search processor 220 communicates this information to the alternative matches service module 250, which may then forward the information to the results collector 240 for presentation to the user.

The alternative matches service module 250 may also identify services that are not selected by the user to be searched but may contain relevant information. For example, the alternative matches service module 250 may utilize the service recognizer 510 of each service that has not been selected by the user to search. If the service recognizer 510 determines that a service would be a good fit for a query, the alternative matches service module 250 may communicate this information to results collector 240 for presentation to the user. Alternatively, this information can be communicated to the query router 230, and a query can be routed to the particular service without intervention from the user. This latter feature may be configurable by the user.

The service manager module 260 functions to keep a list of all providers and services in memory 6. The service manager module 260 can obtain an updated list of providers and services from the registry options module 265 after specific events such as, for example, the initialization of the research library application 205, when the source filter 940 is accessed, or whenever the service manager module 260 is updated.

In addition, the service manager module 260 can request that one or more providers and/or services update their registration information. This request can be in the form of a provider information update request, described in detail with reference to FIG. 17. The service manager module 260 can generate such a request at periodic intervals or as prompted by the registry options module 265. The service manager module 260 will update its list of providers and services when a provider information update response, described in detail with respect to FIG. 18, is received from a provider.

Figure 10:
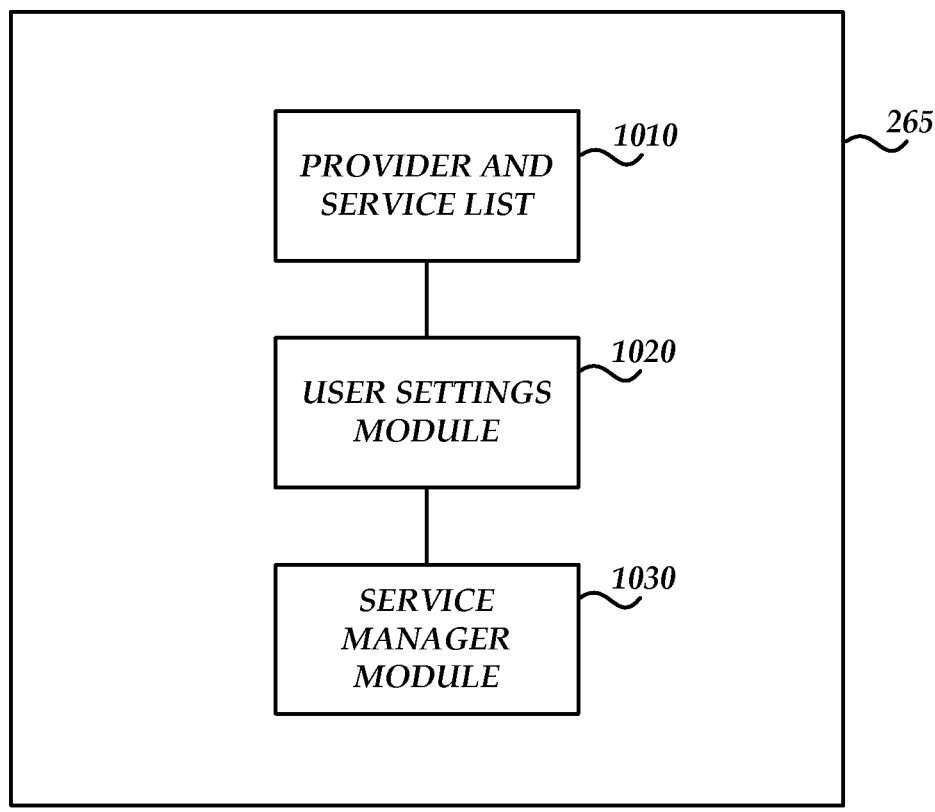
FIG. 10 is a block diagram that shows a registry options module made in accordance with one embodiment of the present invention.

Referring now to FIG. 10, the registry options module 265 is shown in greater detail. The registry options module 265 may communicate with the registry 220 of the personal computer 2. The registry options module 265 may include a provider/service list 1010, a user settings module 1020, and a service manager module 1030. The provider/service list 1010 is a list of each provider and/or service and all of the information associated with that provider and/or service. For example, information for each provider and/or service may include provider address, provider name, service name, categories, and service recognizer, as described with reference to FIG. 19.

The user settings module 1020 may be accessed, for example, using the research library options link 968. The user setting module 1020 allows the user to configure the research library application 205 as desired. Many features of the research library application 205 may be configurable. For example, the length of time allowed for a particular provider to respond to a query may be configured. The number of results displayed from each provider and how the results are displayed may be set. The research library application 205 can be configured to automatically query services that the user has not selected, but that the alternative matches service module 250 has identified as being a good fit for the query. Other features may also be configured using the user settings module 1020.

The service manager module 1030 manages the provider information associated with each provider. The service manager module 1030 may, for example, cause the service manager module 260 to generate a provider information update request when the information for a certain provider has matured for a given amount of time. Further, a provider information update request can be generated when information related to particular service is incomplete or when the user manually requests that the information be updated.

In addition, the service manager module 1030 may also cause the service manager module 260 to generate a provider information update request when the service manager module 1030 receives information related to a new provider or service to be added. An unlimited number of services can be registered. For example, a known provider can include information about a new service. This information about the new service may be, for example, the new service name, the categories to which the new service should belong, etc. Based on this information, a provider information update request can be forwarded to the new service, and the new service can respond with a provider information service response. Based on this response, the new service can be registered with the research library application 205.

Figure 11:
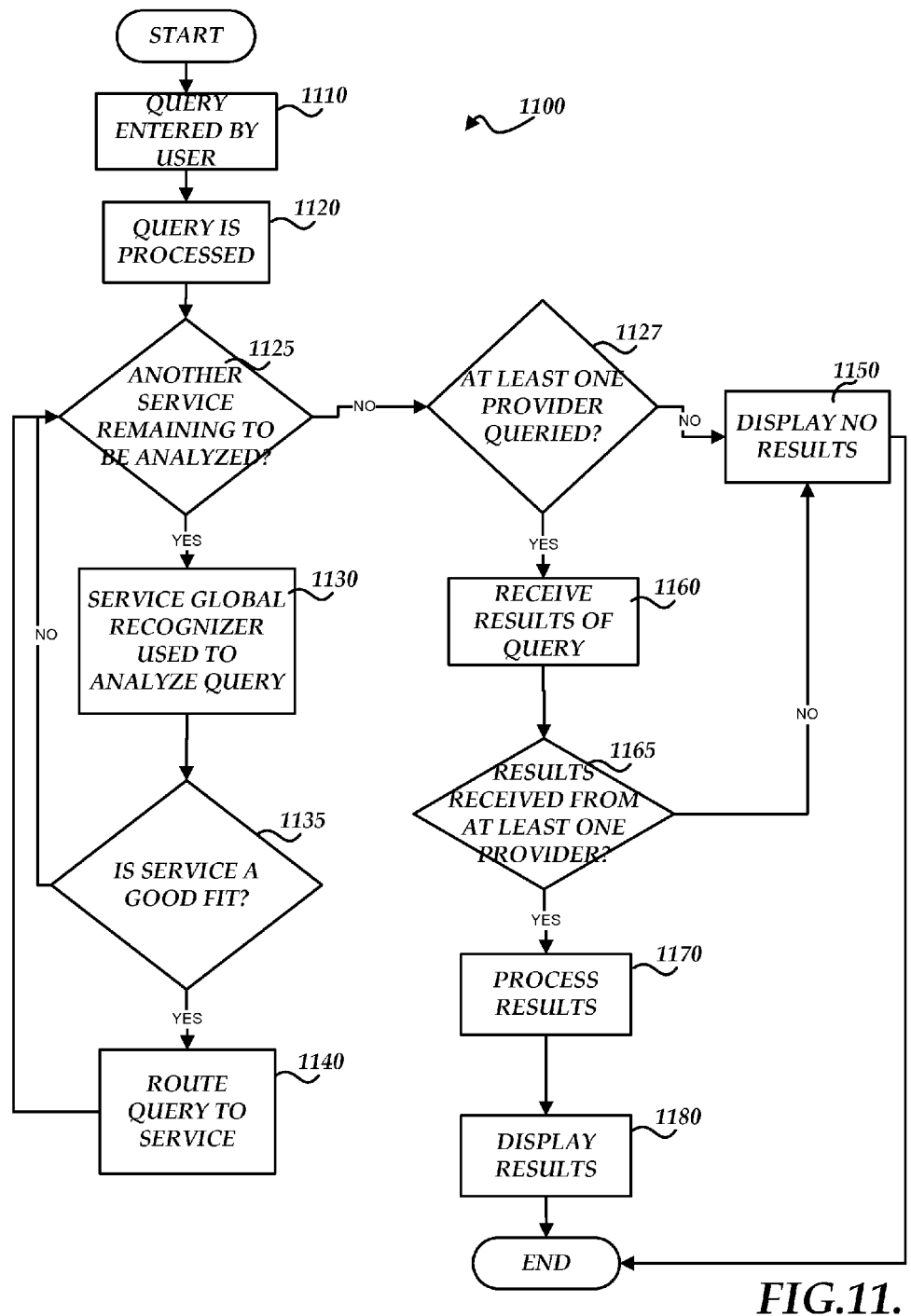
FIG. 11 is a flow diagram showing an illustrative routine for routing a query to one or more providers according to one actual embodiment of the present invention.

Referring now to FIG. 11, a routine 1100 will be described that illustrates the operation of the research library application 205 according to one embodiment of the invention. The routine 1100 begins at operation 1110, where a user enters a query in, for example the query entry box 910. Then, control is passed and the query is processed by, for example, the search processor module 220. This processing may include, for example, word breaking, stemming, spell checking, and context generation.

Once the query has been processed, control is passed to decisional operation 1125, which determines whether at least one service remains to be analyzed. If a service remains to be analyzed, control is passed to operation 1130, in which the particular service recognizer for the particular service is used to analyze the query. Then, in decisional operation 1135, a determination is made as to whether the particular service is a good fit for the query. If the service is a good fit for the query, control is passed to operation 1140, in which the query router module 230, for example, will route the query to the particular service, and control is then passed back to operation 1125. Alternatively, if the particular service is not a good fit, control is passed back to operation 1125.

If decisional operation 1125 determines that there are no additional services to be analyzed, control is passed to decisional operation 1127. In decisional operation 1127, a determination is made as to whether at least one service of one provider has been queried. If no service has been queried, control is passed to operation 1150 and a signifier of no results is displayed in the results user interface 214.

If, however, at least one service of one provider has been queried, in operation 1160 the results from the query are received from one or more providers and one or more services. If, in decisional operation 1165, no results have been received in a given period of time, control is passed to operation 1150 and a signifier of no results is displayed in the results user interface 214. Alternatively, if operation 1165 determines that results have been received, in operation 1170 the results are processed by, for example, the results collector module 240. Then, control is passed to operation 1180, and the results of the query are displayed using, for example, the results user interface 214.

Figure 12:
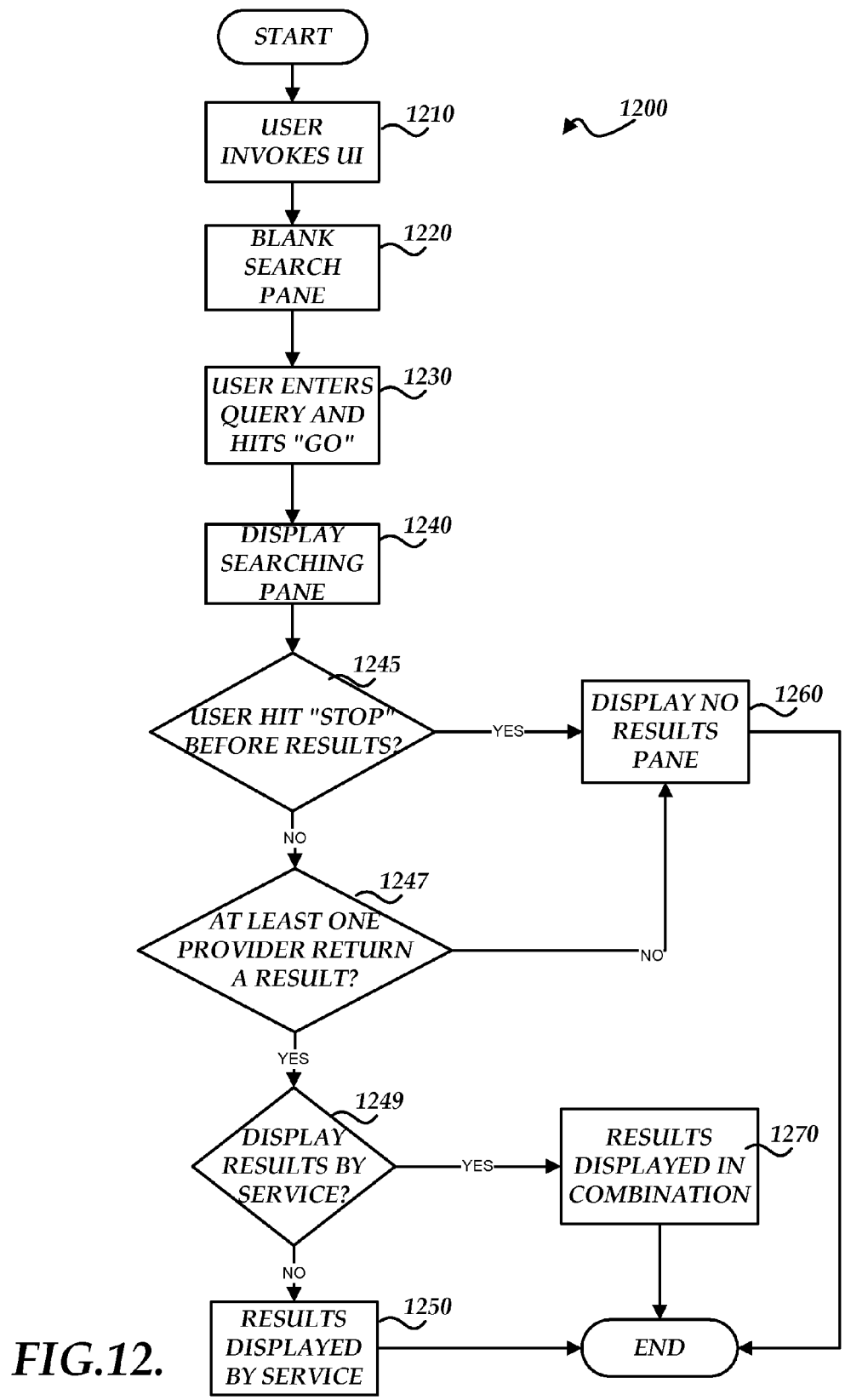
FIG. 12 is a flow diagram showing an illustrative routine for manipulating a graphical user interface according to one actual embodiment of the present invention.

Referring now to FIG. 12, a routine 1200 will be described illustrating the graphical user interface for the query and results user interfaces 212 and 214 according to one embodiment. The routine 1200 begins in operation 1210, where the user invokes the research library application 205. There are several methods by which the user may do this. For example, the user may specifically initiate the research library application 205. Additionally, the user may, from within another program, such as application program 206, initiate an instance of the research library application 205.

Once the research library application 205 has been initialized, in operation 1220 a blank search pane including instructions on how to use the research library application 205 is presented. In operation 1230, the user may enter a query in the query entry box 910. The user may then hit the "Go" button 930 or, alternatively, simply hit the Enter key on the user's keyboard.

Next, in operation 1240, the display enters a searching mode in which, for example, the text "Searching . . . " is displayed in the results area 960. In addition, the "Go" button 930 is transformed into a "Stop" button. Next, in decisional operation 1245, the program determines if the user has hit the "Stop" button before results have been received from one or more providers. A user may stop a query at this time by hitting the "Stop" button or by entering a new query and hitting the "Go" button or Enter. If the user has stopped the query before results are received, control is passed to operation 1260, and a signifier of no results is displayed in the results user interface 214.

Alternatively, if the user has not stopped the query, decisional operation 1247 determines whether at least one provider has returned at least one result. If no results have been returned, control is passed to operation 1260, and a signifier of no results is displayed in the results user interface 214. If results have been returned, control is passed to decisional operation 1249, which determines how the results are to be displayed. If the results are to be displayed by service, control is passed to operation 1250, and the results are to be displayed according to the service that returned each respective result. Alternatively, if the results are to be displayed according in combination according to relevance, the results from the difference services are combined, duplicate results are removed, and the results are displayed according to relevance. The results may then be displayed in the results area 960.

Operations 1210, 1220, and 1230 may be eliminated if the user has initiated a search from another application and indicated within that application what the query is. For example, within a word processor, a user may highlight a specific block of text and initiate a query based on that block of text. It would therefore not be necessary for the user to enter the text in the query text box 910 or hit the "Go" button 930. The text would automatically be entered into the query text box 910 and the search initiated.

Figure 13:
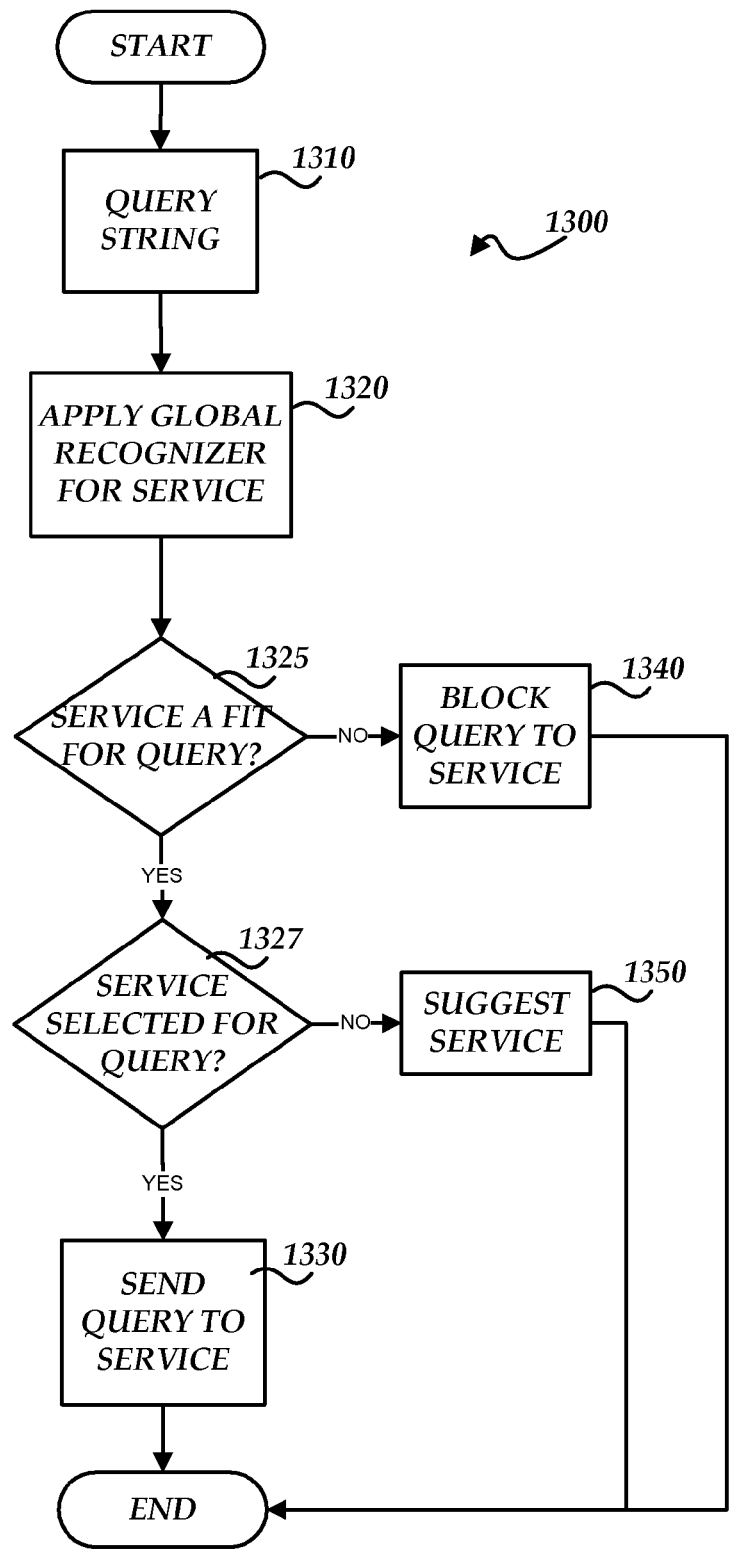
FIG. 13 is a flow diagram showing an illustrative routine for analyzing a query and routing the query according to one actual embodiment of the present invention.
Figure 14:
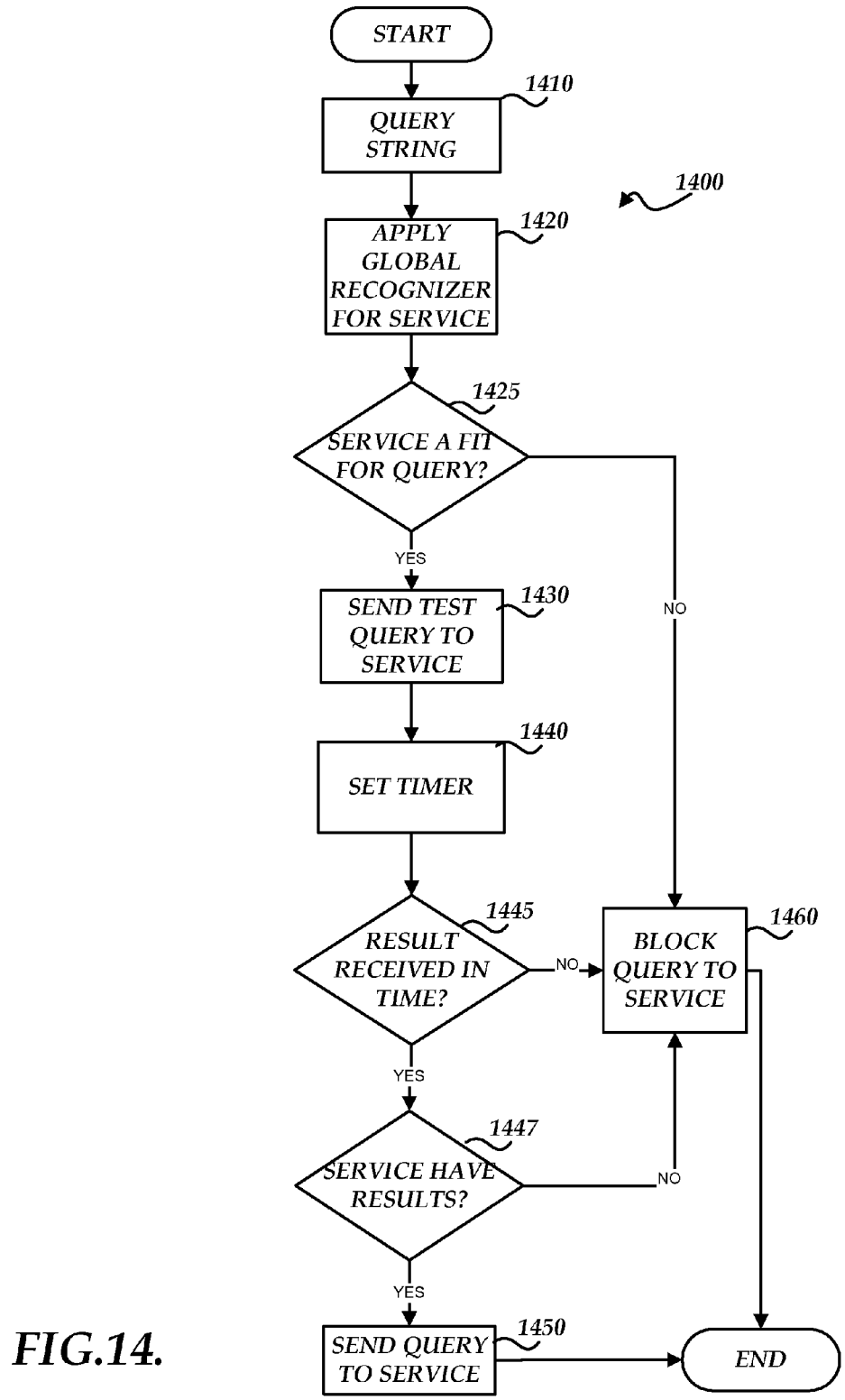
FIG. 14 is a flow diagram showing another illustrative routine for analyzing a query and routing the query according to one actual embodiment of the present invention.

In FIGS. 13 and 14, routines 1300 and 1400 for the query router module 230 will be described. Although only a single sequence for a single service is shown in the figures, multiple sequences would be performed if multiple services are to be analyzed. Referring now to FIG. 13, the routine 1300 beings in operation 1310 where a query string is provided to the query router module 230 after the search processor module 220 has processed the query string. Next, in operation 1320, the service recognizer of the service is applied to the query string. In decisional operation 1325, the service recognizer determines whether the particular service would be a good fit for the query string. This may be accomplished, for example, by comparing each query term of the query string with a list of keywords or phrases contained in the service recognizer, or by using other logic. Based on matching of one or more keywords or phrases with one or more of the query terms, a determination can be made as to whether the service is a good fit for the query string.

If the particular service is a good fit, control is passed to operation 1327, and it is determined whether the particular service has been selected by the user to be queried. If the service has been selected to be queried, control is passed to operation 1330, and the router module 550 builds and sends a query to the particular service. Alternatively, if the service has not been selected by the user to be queried, the particular service may be suggested to the user as an alternative source of relevant information.

If, in operation 1325, it is determined that the particular service is not a good fit for the query string, control is passed to operation 1340 and the particular service is blocked from receiving a query.

Operations 1327 and 1350 may be eliminated depending on the configuration of the research library application 205. For example, if the research library application 205 is configured to send a query to a particular service that is determined to be a good fit, no matter whether or not the service has been selected to be searched by the user, control may be passed directly from operation 1325 to operation 1330, and a query may be sent to the particular service.

Referring now to FIG. 14, an alternative routine 1400 for identifying services and routing queries to services will be described. The routine 1400 begins in operation 1410, where a query string is provided to the query router module 230 after the search processor module 220 has processed the query. Next, in operation 1420, the service recognizer of the service is applied to the query string. In decisional operation 1425, the service recognizer determines whether the particular service would be a good fit for the query string. If the particular service is a good fit, control is passed to operation 1430, and a test query is sent by the router module 550 to the service. A test query may include a portion of or the entire query string. Next, in operation 1440, a timer is set.

Next, in decisional operation 1445, the program determines if a result from the service has been received. The result from the service may consist simply of identification information to identify the particular service and a boolean "Yes" if the service does contain relevant information, and a "No" if the service does not contain relevant information. If a result is received, control is passed to decisional operation 1447 to determine if the particular service has relevant information. If the response from the particular service is positive, control is passed to operation 1450, and a full query is sent by the router module 550 to the service. Alternatively, instead of sending a query to the service, the particular service could be suggested to the user as a possible source of relevant information.

If, in operations 1425, 1445, or 1447, the decisional operation is in the negative, control is passed to operation 1460 and a query to the particular service is blocked.

Various data structures may be used to communicate between the different modules comprising the research library application 205 and between the research library application 205 and the providers. For example, referring now to FIG. 15, an illustrative data structure 1500 for a search request to a provider will be described. The data structure 1500 may include the following parameters: RequestID 1510, Tracking/Origin 1520, Tracking/Destination 1530, Return Format/Type 1540, Return Format/Language 1550, Query/Original 1560, Query/Keywords 1570, and Query/Context 1580. The RequestID 1510 parameter is a random ID generated to identify the query. The Tracking/Origin 1520 parameter is the origin of the query, such as, for example, a process identification number ("PID"). The Tracking/Destination 1530 parameter is the ID for the destination service for the query such as, for example, the names or identifications for the services with the provider that should be searched. The Return Format/Type 1540 parameter is the format expected by the application program for the search results such as, for example, RRXML or another defined format. The Return Format/Language 1550 is the language the query is in such as, for example, English, Spanish, etc. The Query/Original 1560 parameter is the original query string. The Query/Keywords 1570 parameter is the query terms created during word breaking and stemming by the search processor module 220. The Query/Context 1580 parameter is the application from which the query originated.

Referring now to FIG. 16, an illustrative data structure 1600 for a search response from a provider will be described. The data structure 1600 may include the following parameters: Query ID 1610, Provider ID 1620, Result Block from Service 1 1630, and Result Block from Service 2 1640. The Query ID 1610 parameter identifies the specific query. The Provider ID 1620 parameter identifies the specific provider from which the results have been sent. The Result Block from Service 1 1630 parameter includes, for example, the number of results and the information related to each of the results. The Result Block from Service 2 1640 parameter includes similar data. Additional Result Blocks may be included if more than two services for a particular provider have been searched.

Referring now to FIG. 17, an illustrative data structure 1700 for a provider information update request will be described. The data structure 1700 may include the following parameters: Protocol Version Number 1710, Provider Revision 1720, and Information Request Flag 1730. The Protocol Version Number 1710 parameter is the protocol version supported by the research library application 205. The Provider Revision 1720 parameter is the current revision of the provider as registered. The Information Request Flag 1730 parameter is a boolean flag that indicates to the provider that the data structure is a request for updated registration information.

Referring now to FIG. 18, an illustrative data structure 1800 for a provider information update response will be described. The data structure 1800 may include the following parameters: Provider Address 1810, Provider Name 1820, Protocol Version Number 1830, Provider Revision 1840, Provider Properties 1850, Service List 1860, Language SKU 1870, and Country SKU 1880. The Provider Address 1810 parameter is the address of the provider such as, for example, a path name or IP address. The Provider Name 1820 parameter is the name of the provider. The Protocol Version Number 1830 parameter is the protocol version supported by the research library application 205. The Provider Revision 1840 parameter is the latest revision of the provider. The Provider Properties 1850 parameter includes basic properties of the provider such as, for example, provider name, path, etc. The Service List 1860 parameter includes a list of services, including each service's properties such as, for example, a service recognizer for each service. The Language and Country SKU 1870 and 1880 parameters are SKUs specific to a language and country and allow for the tailoring of content based on location.

Referring now to FIG. 19, an illustrative data structure 1900 for a provider service registration information will be described. The data structure 1900 for the provider service registration information includes the following parameters: Service Name 1910, Categories 1920, and Service Recognizer 1930. The Service Name 1910 parameter is the name of the particular service. The Categories 1920 parameter is the one or more categories to which the service belongs. The Service Recognizer 1930 parameter is the service recognizer for the service and may, for example, consist of a list of keywords.

Many modifications and alternative embodiments are possible. In one alternative embodiment, an advertiser module may be coupled to the query router module 230. The advertiser module may allow one or more services to participate in an advertising program. If a particular service does participate in the advertising program, the advertiser module controls the query router to generate a search query to the particular service even if the user does not choose to search the particular service. Alternatively, the advertiser module can cause one or more services to be displayed more prominently on the search user interfaces.

In another alternative embodiment, the query router module 230 can be configured so that it is unnecessary for the user to select the services to be searched. For example, a user may enter a query and initiate a search. The query router 230, and specifically the service recognizer 510, can be used to identify which services are a good fit and which services are not a good fit for the query. The query router module 230 can then send queries to the services that are a good fit and block queries to services that are not a good fit. In this manner, the selection of the particular services to search can be completely automated.

In yet another alternative embodiment, the search request may include a parental control parameter. This parameter may be used to allow the research library application to request results from the provider that are non-objectionable. If no results from a provider are returned due to the parental control parameter being active, an error response may be provided in the results user interface to indicate that no results have been provided due to the parental control.

Based on the foregoing, those skilled in the art should appreciate that various embodiments of the present invention provide a method, system, apparatus, and computer-readable medium for routing a query to one or more providers. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for routing queries, the system comprising: a processor; and one or more computer-readable storage media on a client side encoding instructions to create a search processor, a service recognizer, a query router, and a results interface, wherein:
the search processor configured to receive a query from a user passed by an application program, and to break the query into one or more query terms, wherein the application program is configured to allow the user to highlight a portion of text in a word processing document and select one or more action items from a menu to initiate the query based on the highlighted text;
the service recognizer configured to analyze the query terms to identify one or more providers that are matches for the query terms, and to group the providers into a plurality of categories according to information provided by the providers, wherein the one or more providers are determined from any user-selected providers and can include one or more non-selected providers based at least in part on the query terms;
the query router configured to route the query terms to providers that are matches, wherein the providers each include a database of information that is queried using the query terms;
the results interface configured to present results in context within the application program from the providers that are matches to the user in context within the application program, results being displayed according to each provider that returned each result;
the results interface displaying: a dropdown menu that when selected allows the user to select from displayed prior queries based upon previous query text; and forward and backward buttons that allow the user to move forward and backward between the prior queries generated by the search processor and included within the dropdown menu and shown in the results interface, wherein the results from the providers that are matches are stored on the one or more computer-readable storage media.

2. The system of claim 1, wherein the search processor is further configured to parse the query, break the query into the query terms, stem at least one of the query terms, spell check at least one of the query terms, and generate context based on an origin of the query.

3. The system of claim 1, wherein the service recognizer is further configured to compare the query terms to a list of terms for each of the providers to identify the providers that are matches for the query terms.

4. The system of claim 1, wherein the service recognizer is further configured to send a test query including at least a portion of the query to a particular provider and determine whether or not the particular provider is a match based on a response to the test query from the particular provider.

5. The system of claim 1, wherein the dropdown menu is separate from the forward and backward buttons.

6. A method for routing a query, the method comprising:
receiving a query from a user passed by an application program on a client side, including:
allowing the user to highlight text in a word processing document; and
allowing the user to select one or more action items from a menu to initiate the query;
processing the query on the client side to create one or more query terms;
analyzing the query terms on the client side to identify one or more providers that are matches for the query terms;
sending a test query including at least a portion of the query to a particular provider;
determining whether or not the particular provider is a match based on a response to the test query from the particular provider;
grouping the providers into a plurality of categories on the client side according to information provided by the providers;
allowing the user to select a category from the plurality of categories on the client side to route the query;
querying the providers that are matches;
assembling results from the providers into a hierarchy, the hierarchy including a top level having each provider's name and a status for each provider indicating whether or not the provider is available, and the hierarchy including a bottom level listing search results for one or more of the providers; and
presenting the results from the providers to the user in context within a results interface of the application program.

7. The method of claim 6, wherein the step of processing the query further comprises analyzing the query to identify patterns in the query.

8. The method of claim 6, wherein the step of processing the query further comprises:
parsing the query;
breaking the query into the query terms;
stemming at least one of the query terms;
spell checking at least one of the query terms; and
generating context based on an origin of the query.

9. The method of claim 6, wherein the step of analyzing the query terms further comprises comparing the query terms to a list of terms for each of the providers to identify the providers that are matches for the query terms.

10. The method of claim 6, further comprising:
presenting a dropdown within the results interface that allows the user to select from prior query terms; and
presenting forward and backward buttons within the results interface that allow the user to move forward and backward between the results generated by the search processor and shown in the results interface.

11. A method for routing a query, the method comprising:
allowing a user to highlight text in a word processing program to initiate the query based on the highlighted text;
receiving, by an application program, the query from the word processing program on a client side;
processing the query on the client side to create one or more query terms, and to identify patterns in the query;
comparing the query terms on the client side to a list of terms for each provider of one or more providers to identify providers that are matches for the query terms, wherein the one or more providers are determined from any user-selected providers and can include one or more non-selected providers based at least in part on the query terms;

grouping the providers into a plurality of categories according to information provided by the providers;

allowing the user to select a category from the plurality of categories to route the query to the providers that are matches; querying the providers that are matches;

presenting results from the providers that are matches to the user in context within a results interface of the word processing program, the results being displayed according to each provider that returned each result;

displaying a dropdown menu within the results interface that when selected allows the user to select from displayed prior queries based upon previous query text;

and presenting forward and backward buttons within the results interface that allow the user to move forward and backward between the prior queries generated by a search processor, included in the dropdown menu and shown in the results interface, wherein the results from the providers that are matches are stored on one or more computer-readable storage media.

12. The method of claim 11, wherein the step of processing the query further comprises:

parsing the query;
breaking the query into the query terms;
stemming at least one of the query terms;
spell checking at least one of the query terms; and
generating context based on an origin of the query.

* * * * *